(12) United States Patent
Hall et al.

(10) Patent No.: US 8,060,538 B2
(45) Date of Patent: Nov. 15, 2011

(54) METHOD AND SYSTEM FOR CREATING A CONCEPT-OBJECT DATABASE

(75) Inventors: Stephen G. Hall, Bainbridge Island, WA (US); Arun T. Jacob, Mercer Island, WA (US); Mark Thomas Greaves, Mercer Island, WA (US); Paul G. Allen, Seattle, WA (US)

(73) Assignee: Vulcan, Inc., Seattle, WA (US)

( * ) Notice: Subject to any disclaimer, the term of this patent is extended or adjusted under 35 U.S.C. 154(b) by 0 days.

(21) Appl. No.: 12/718,774

(22) Filed: Mar. 5, 2010

(65) Prior Publication Data

US 2010/0250586 A1 Sep. 30, 2010

Related U.S. Application Data

(63) Continuation of application No. 11/489,243, filed on Jul. 18, 2006, now Pat. No. 7,707,161.

(51) Int. Cl.
*G06F 17/30* (2006.01)
(52) U.S. Cl. ...................................................... 707/803
(58) Field of Classification Search .................. 707/803, 707/999.102
See application file for complete search history.

(56) References Cited

U.S. PATENT DOCUMENTS

2003/0126136 A1* 7/2003 Omoigui .......................... 707/10
2004/0249795 A1* 12/2004 Brockway et al. ................ 707/3
* cited by examiner

*Primary Examiner* — Kimberly Lovel
*Assistant Examiner* — Mohammad R Uddin
(74) *Attorney, Agent, or Firm* — Olympic Patent Works, PLLC

(57) ABSTRACT

Embodiments of the present invention are directed to acquiring information from the worldwide web, organizing information acquired from the worldwide web, and using the acquired and organized information to facilitate web-page searching, web-page browsing, and other worldwide-web-based activities. In one embodiment of the present invention, a database of concept objects is created from an initial set of semantic objects and from hyperlink information obtained from web pages by one or more web crawlers. The initial set of semantic objects is processed using hyperlink based objects created by the web crawler. The processed semantic objects are then associated with additional hyperlink-based objects to create a concept-object database. In certain embodiments of the present invention, the concept-object database can be further refined and supplemented in an automated fashion by additional web crawling, subsequent association of hyperlink-based objects with concept objects, and creation of new concept objects as well as by user input to, and editing of, the concept-object database. The concept-object database may be employed, in various embodiments of the present invention, to facilitate web browsing, web-page searching, and other worldwide-web-base activities.

6 Claims, 25 Drawing Sheets

```
<!DOCTYPE HTML PUBLIC "-//W3C//DTD HTML 4.01 Transitional//EN">
<html><head>
<!--SpaceID=2716149 loc=HR001 noad -->
<script language=javascript>
var now=new Date;t1=0,t2=0,t3=0,t4=0,t5=0,t6=0,cc="",yip"";t1=now.getTime();
function err(a,b,c) {
var img=new Image;
img.src='http://srd.yahoo.com/hp5-err/'+escape(a)+','+escape(b)+','+escape(c)+'/*1';
return true;
}
window.onerror=err;
</script>
<title>Yahoo!</title>
<meta http-equiv="Content-Type" content="text/html; charset=UTF-8">
<meta http-equiv="PICS-Label" content='(PICS-1.1 "http://www.icra.org/ratingsv02.html" l r (cz 1 lz 1 nz
1 oz 1 vz 1) gen true for "http://www.yahoo.com" r(cz 1 lz 1 nz 1 oz 1 vz 1)
"http://www.rsac.org/ratingsv01.html" l r (n 0 s 0 v 0 l 0) gen true for "http://www.yahoo.com" r (n 0 s 0 v
0 l 0))'>
<script language=javascript>var
YLH='_ylh=X3oDMTFlMzdjc2RvBF9TAzI3MTYxNDkEcGlkAzExNDk3Mjg5NDYEdGVzdAMwBHRt
cGwDaW5kZXgtaWU-'; var PID='1149728946'; document.write('<base href="http://www.yahoo.com/"
target="_top">');</script><noscript><base
href="http://www.yahoo.com/_ylh=X3oDMTFlMzdjc2RvBF9TAzI3MTYxNDkEcGlkAzExNDk3Mjg5N
DYEdGVzdAMwBHRtcGwDaW5kZXgtaWU-"target="_top"></noscript>
<script language=javascript><!--
lck=",ess=1149729558,ylp='p.gif?t=1149729558&_yip=A0Je5iIWc4dE_X4BubiIcSkA',_lcs=",crumb='d4
8513d0959c814fca07b04377550468,1149729558';
--></script><script language=javascript>
var cook_domain='.yahoo.com';
if(typeof(YLH)!='undefined'&& YLH!='')
document.cookie='D='+YLH+';path=/;domain='+cook_domain;
</script>
<script language=javascript>
var _phppl="";function plinks(){
```

```
if (Math.random()*100<1) {
  var btt = new bts(new Array("http://p2.www.scd.yahoo.com/b1.gif",
    "http://p2.www.mud.yahoo.com/b1.gif",
    "http://p2.www.dcn.yahoo.com/b1.gif",
    "http://www.glb.temporary.com/b2.gif"));
  var btowo = window.onload;
  window.onload=function () { if (btowo) btowo(); btt.fetch(); setTimeout("btt.report()",5000); }
}
</script>
</body>
</html>
<script language=javascript>ULT_KEY='X3oDMTFlMTVubjNvBHRtcGwDaW5kZXgtaWUEX1MDMjcxNjE0
OQRwaWQDMTE0OTcyODk0NgR0ZXN0AzA-';</script><script language=javascript>
if(window.yzq_p==null)document.write("<ser"+"ipt language=javascript
src=http://us.js2.yimg.com/us.js.yimg.com/lib/bc/bc_2.0.3.js></ser"+"ipt>");
</script><script language=javascript>
if(window.yzq_p)yzq_p('P=_oj4kJe5iJOikVfRIEmVTNh0b3IykSHexYAAn6l&T=13tsk8a48%2fX%3d11
49729558%2fE%3d2716149%2fR3dyahoo_top%2fK%3d5%2fV3d1.1%2fW%3dJ%2fY%3dYAHOO
%2fF%3d4010988442%2fS%3d1%2fJ%3d22E65E42'),
if(window.yzq_s)yzq_s();
</script><noscript><img width=1 height=1 alt=""
src="http://us.bc.yahoo.com/b?P=_oj4kJe5iJOikVfRIEmVTNh0b3IykSHexYAAn6l&T=142f0pvgd%2fX
%3d1149729558%2fE%3d2716149%2fR%3dyahoo_top%2fK%3d5%2fV%3d3.1%2fW%3dJ%2fY%3dY
AHOO%2fF%3d2666952175%2fJ%3d-1%2fS%3d1%2fJ%3d22E65E42"></noscript>
<!--p3.www.scd.yahoo.com compressed/chunked Wed Jun 7 18:19:18 PDT 2006 -->
```

*Figure 2B*

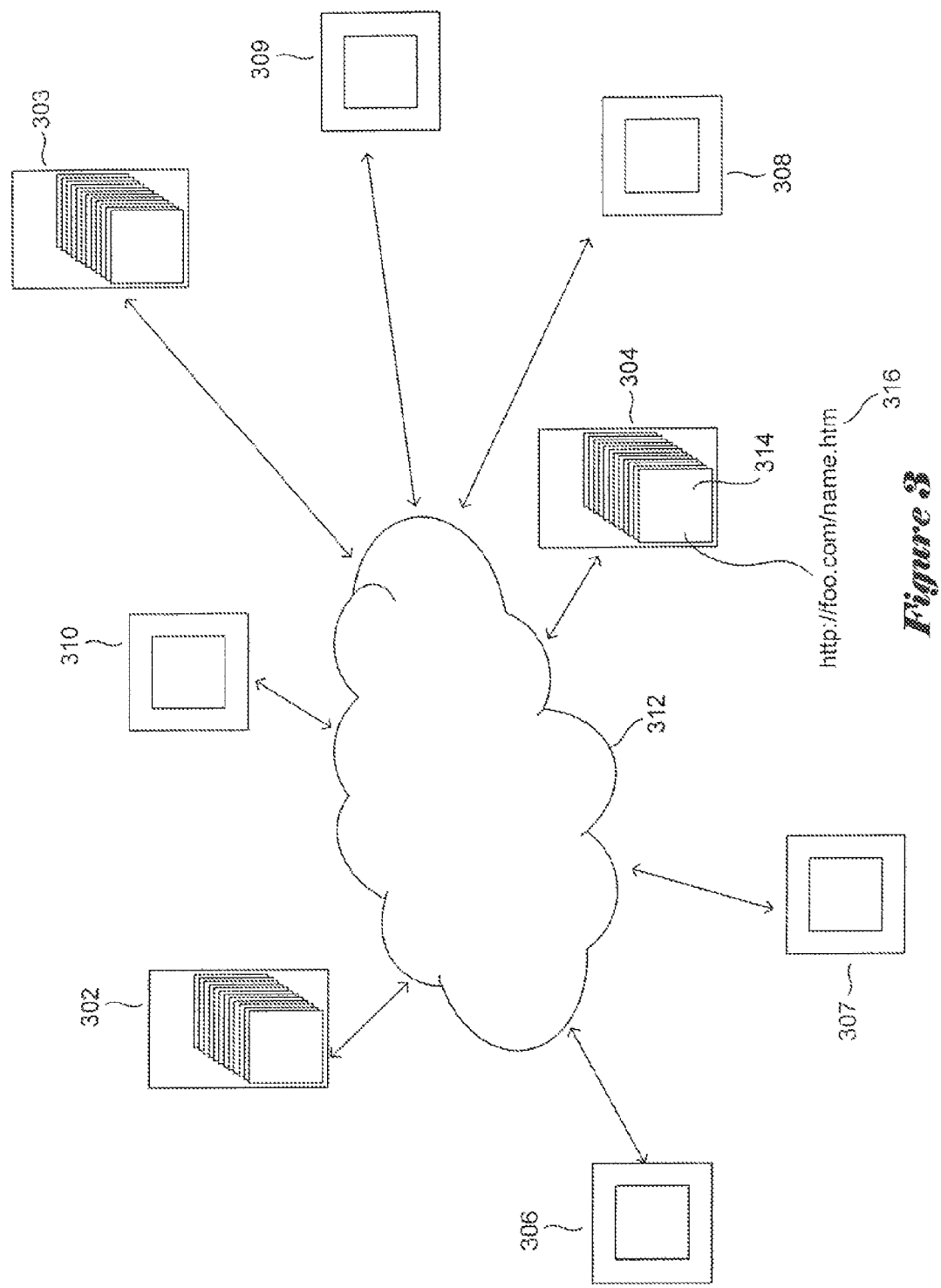

METHOD AND SYSTEM FOR CREATING A CONCEPT-OBJECT DATABASE

CROSS-REFERENCE TO RELATED APPLICATION

This application is continuation of application Ser. No. 11/489,243, filed Jul. 18, 2006 now U.S. Pat. No. 7,707,161.

TECHNICAL FIELD

The present invention is related to the worldwide web and the Internet, automated acquisition of semantic-level knowledge from electronically stored data, electronically interconnected data-storage and data-display devices, and, in particular, to a method and system for creating a database of concept objects that reflect semantic knowledge gleaned from electronically encoded text documents and hyperlinked text documents.

BACKGROUND OF THE INVENTION

Development of the Internet, during the past 30 years, development and widespread adoption of personal computers during the past 25 years, and development of the HyperText Markup Language ("HTML") and web browsers, during the 1990's, has led to rapid development of the worldwide web. The worldwide web is a distributed repository of information encoded in HTML documents and various types of audio, video, graphical, application-specific, and other files, data, and executables referenced from HTML documents. HTML documents are accessed by users from hundreds of thousands of web-page servers distributed throughout the world and are rendered for graphical display as web pages by web browsers running on the users' computers. Development of the worldwide web has, in turn, spawned enormous commercial activity through on-line stores and trading communities and through development of powerful and enormously commercially successful information-acquisition tools, such as the Yahoo and Google search engines. Few technical advances have had greater and more immediate social and commercial impact.

The stunning success and rapid adoption of the worldwide web has also also spawned a number of technological problems. Although the worldwide web is now a vast repository of millions of documents related to almost every possible topic, the information contained within the millions of HTML documents, and media files referenced from the HTML documents, is largely unstructured. Current search tools, including the Yahoo and Google search engines, provide keyword and key-symbol searches made possible by vast indexes of compiled word-and-symbol occurrences within web pages. These indexes are created and continuously supplemented by constant, automated access of web pages, parsing of the accessed web pages to extract words and symbols contained within the web pages, and creation of, and addition of data to, large, electronic databases that index the web pages by word and symbol occurrence. While keyword searches are powerful tools for finding information within the millions of HTML documents that reside within the worldwide web, keyword and key-symbol searching is typically imprecise. A keyword search often returns hundreds, thousands, or even greater numbers of undesired HTML documents and, at the same time, often fails to find large numbers of HTML documents that pertain to subject matter to which the keyword search is directed. Keyword searching may also be difficult to incorporate within other web-page browsing activities related to information acquisition from web pages.

These well-recognized and increasingly user-perceptible deficiencies in keyword searching have led to many different proposals for reorganizing the worldwide web and/or accessing information stored within the worldwide web. Certain of the proposals would require massive and fundamental changes to the current structure of, and information-encoding used in, the worldwide web. Others involve sophisticated machine-learning and semantic-knowledge-acquisition tools, practical implementations of which are not yet available. However, with the number of documents contained within the worldwide web increasing at an exponential rate, information-organization and information-access tools that lead to more immediate improvements in organizing and accessing information stored within the worldwide web are currently needed by worldwide web users, web-browser developers, and developers and vendors of myriad application programs, commercial electronic marketplaces, and other applications and venues that rely on information stored within the within the worldwide web.

SUMMARY OF THE INVENTION

Embodiments of the present invention are directed to acquiring information from the worldwide web and other electronic-data repositories, organizing information acquired from the worldwide web and other electronic-data repositories, and using the acquired and organized information to facilitate web-page searching, web-page browsing, other worldwide-web-based activities, and additional activities directed to searching, browsing, and analyzing stored electronic data. Embodiments of the present invention are generally directed to associating hyperlinks with concept objects in order to create concept databases.

In one, disclosed embodiment of the present invention, a database of concept objects is created from an initial set of semantic objects and from hyperlink information obtained from web pages by one or more web crawlers. The initial set of semantic objects is processed using hyperlink based objects created by the web crawler. The processed semantic objects are then associated with additional hyperlink-based objects to create a concept-object database. In certain embodiments of the present invention, the concept-object database can be further refined and supplemented in an automated fashion by additional web crawling, subsequent association of hyperlink-based objects with concept objects, and creation of new concept objects both automatically as well as by user input to, and editing of, the concept-object database. The concept-object database may be employed, in various embodiments of the present invention, to facilitate web browsing, web-page searching, and other worldwide-web-base activities; searching, browsing, and analysis of various types of electronically-encoded information; and interconnect connectivity and semantic interoperability via a wide variety of communications-based applications and devices.

BRIEF DESCRIPTION OF THE DRAWINGS

FIGS. 2A-2B show a small portion of the HTML description of the displayed web page shown in FIG. 1.

FIG. 3 shows an abstract, simplistic depiction of the worldwide web.

FIGS. 19-21 illustrate concept-object-database refinement and augmentation according to an embodiment of the present invention.

FIG. 22 illustrates an enhanced browser that creates pop-up windows overlying a displayed web page.

FIGS. 23-24 illustrate additional web-browser enhancements according to an embodiment of the present invention.

DETAILED DESCRIPTION OF THE INVENTION

Figure 1:
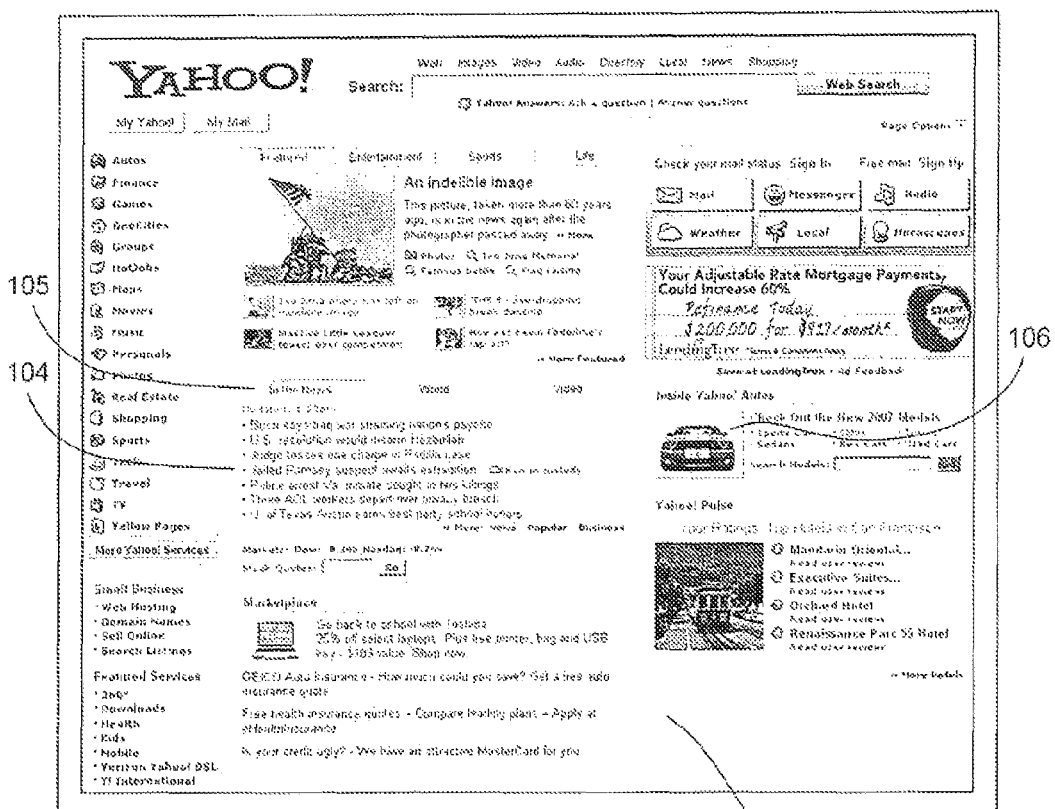
FIG. 1 shows a typical web page rendered by a web browser for display by a personal computer.

FIG. 1 shows a typical web page rendered by a web browser for display by a personal computer. The displayed web page 102 includes text, such as the bulleted text lines 104 under the heading "In the News" 105, images, such as the displayed images of cars 106, and various graphics, icons, and other active elements that a user may input a mouse click to in order to display digital information. FIGS. 2A-B show a small portion of the HTML description of the displayed web page shown in FIG. 1. The full HTML encoding of the displayed web page shown in FIG. 1 fills about 22 pages. The HTML encoding includes various tags, such as tag 201 enclosed within angle brackets, text, such as the title "Yahoo!" 202, links to media files, such as the image files 203, references to other web pages, such as the reference 204 to a Yahoo web page beginning with the text "href." a variety of control statements, such as "if" statement 205, and invocations of Java-script routines. Although web server computers can store and generate HTML documents in various ways, an HTML document is essentially equivalent to a file, with a file name, stored within a file-system directory on a web-server computer. An HTML document contains the HTML description of a web page and is transferred to a requesting user's computer system for rendering by the user's web browser.

FIG. 3 shows an abstract, simplistic depiction of the worldwide web. The worldwide web comprises a number of web-page servers 302-304 interconnected, via the Internet 312, with a number of user computer systems 306-310 and other electronic devices that access and render HTML documents requested from the web servers 302-304. Each web page is described by an HTML document, such as HTML document 314 within web server 304. The location of the HTML document is represented by a universal resource locator ("URL") 316, a text string that specifies a full or relative worldwide-web path to the stored HTML document. The URL is translated by an Internet server into the Internet address and page location of the web-page server on which the HTML document can be found. The web-page server translates a received URL into the name and location of the HTML document within the web-page-server's file system. Thus, at a high level, the worldwide web comprises web-page servers, user computers and other user devices that access web pages hosted by the web-page servers, and the Internet communications medium that interconnects web-page servers and user computers and other user devices.

Figure 4:
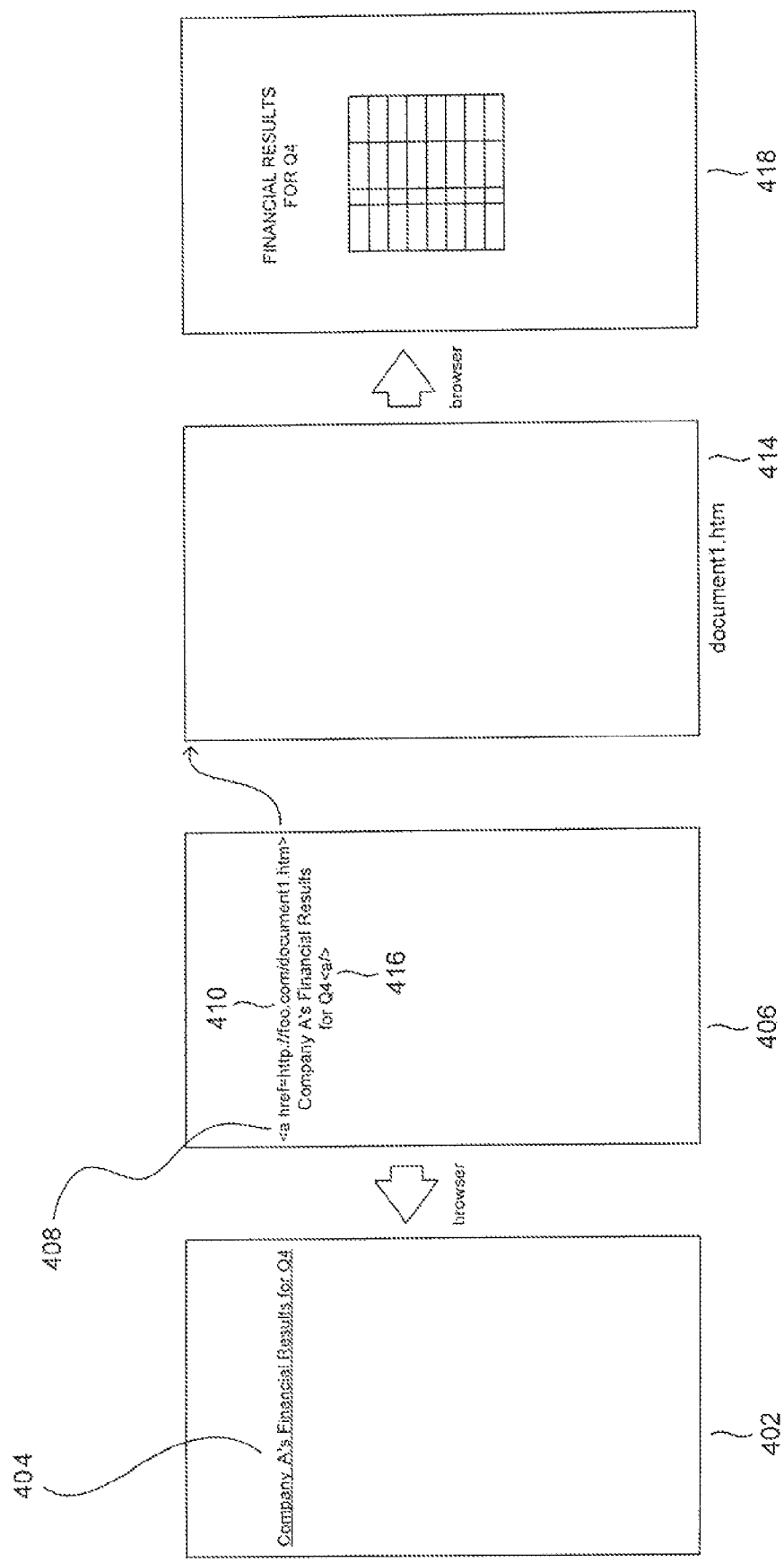
FIG. 4 illustrates a hyperlink.

A fundamental structuring of information contained within the worldwide web occurs through hyperlinks that link web pages containing the hyperlinks to other web pages. FIG. 4 illustrates a hyperlink. On a rendered web page 402, a hyperlink 404 generally appears as a text caption, or anchor text, that indicates or describes a web page that can be viewed by controlling a cursor to overlie the text caption and inputting a mouse click, or other input, to the displayed anchor text of hyperlink 404. In the HTML document 406 that describes the web page, the hyperlink is represented as a text string 408 that includes the URL 410 of the linked HTML document 414 and the anchor text 416 that annotates the displayed hyperlink 404 in the rendered web page 402. Upon entering a mouse click or other user input to the displayed anchor text of hyperlink 404, the user's web browser is signaled to request the linked HTML document 414 from a remote web-page server. When the linked HTML document is received, the user's web browser renders and displays the linked HTML document 414 as rendered web page 418.

Figure 5:
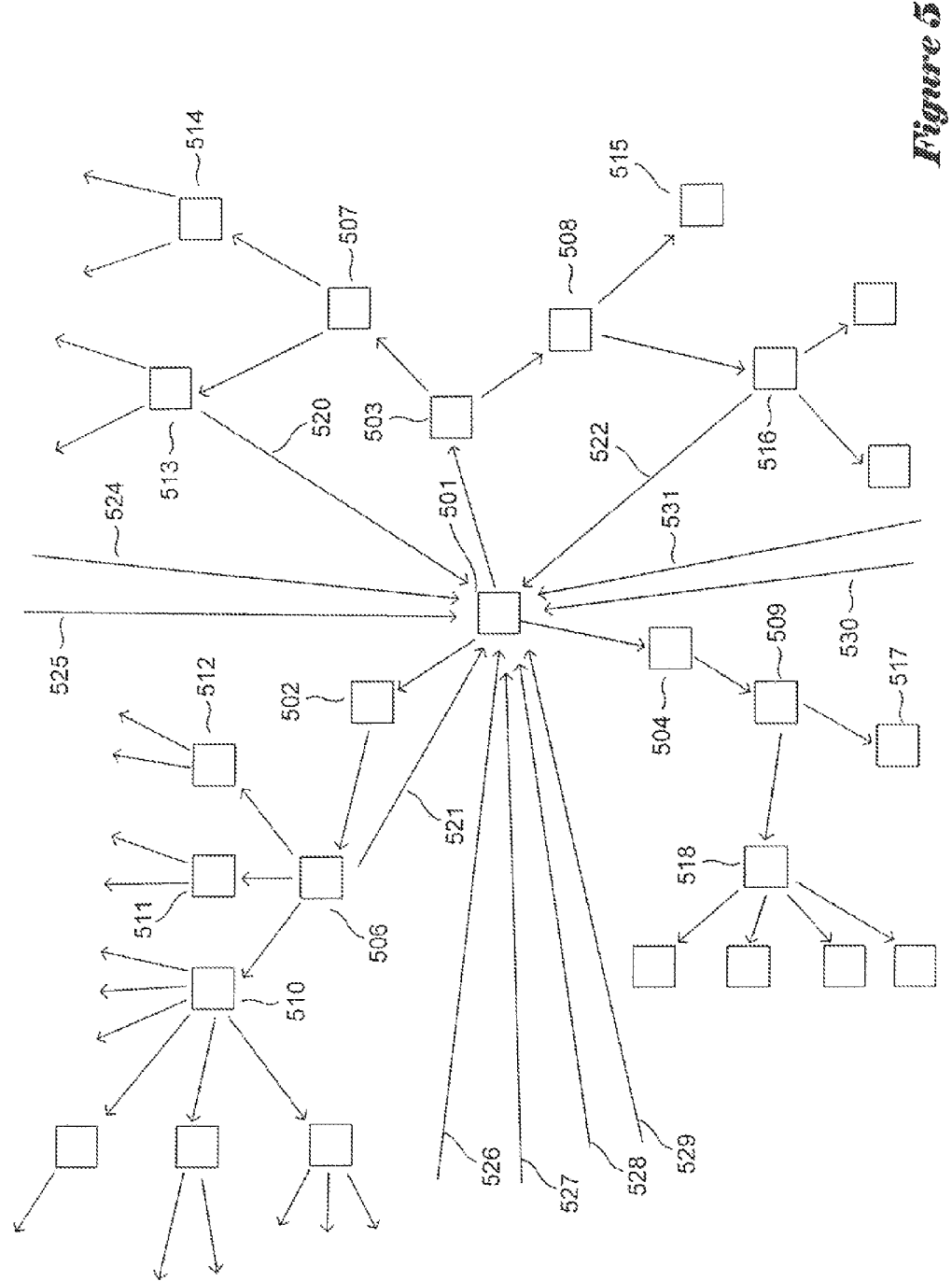
FIG. 5 illustrates hyperlink-based organization of information within the worldwide web.

FIG. 5 illustrates hyperlink-based organization of information within the worldwide web. Considering a first web page 501 as an initial reference point, in an example shown in FIG. 5, three other web pages 502-504 are directly linked to the reference web page 501 through hyperlinks displayed on the reference web page. The directly linked web pages can be thought of as a first sphere, or onion layer, surrounding the reference web page. These three web pages are, in turn, linked to additional web pages 506-509 that can be considered as a second sphere, or onion layer that encloses the first onion layer and that, in turn, are linked to a next set, or third sphere, of web pages 510-518. The onion layers of increasingly more distantly and indirectly linked web pages may continue to expand to encompass thousands or hundreds of thousands of web pages. In addition, as shown in FIG. 5, the reference web page 501 may itself be referenced by tens, hundreds, thousands, or more web pages residing within the worldwide web. Certain of these references to a reference web page may be viewed as internal links, such as links represented by arrows 520-522 in FIG. 5. These internal links are part of a cycle of links that include the reference web page. Many pages of a web site, for example, may reference the home page of the web site, forming cycles of links indicative of the presence of internal links. Internal links generally employ relative web-page references rather than full web-page references. Other references, such as the references represented in FIG. 5 by arrows 524-531, can be viewed as external links contained in web pages that are not directly or indirectly referenced by the web page 501.

Figure 6:
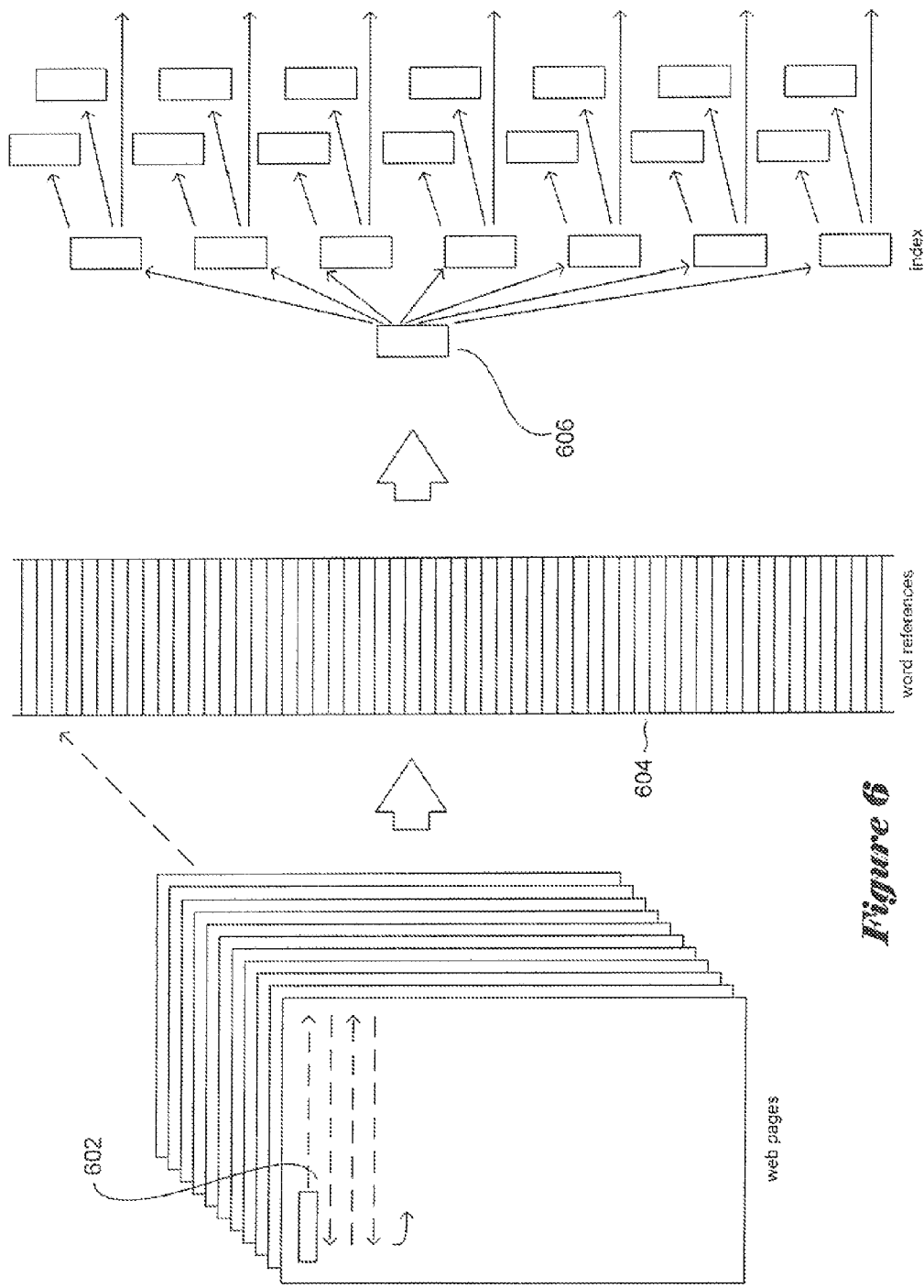
FIG. 6 illustrates current web-page searching techniques.

FIG. 6 illustrates current web-page searching techniques. Web search engines use web crawlers, automated software routines that traverse the worldwide web in order to access and analyze as many different available web pages as possible. A web crawler may parse the HTML description of each accessed web page 602 in order to identify all of the text words and text symbols within the HTML description of the web page that are rendered for display by a web browser. The web crawler accumulates a database of text words and text symbols 604 along with references to accessed web pages that include the references to accessed web pages that include the text words and text symbols, which are ultimately used to create one or more massive, but extremely efficient indexes 606 that index worldwide-web pages by text-word and text-symbol occurrences. The indexes may embody sophisticated ranking metrics and statistics in order to direct keyword and key-symbol searches to the most promising candidate target web pages. A search engine provides a web-page interface to remote users that allows remote users to enter a number of words and symbols that describe a topic or concept that the user wishes to find web pages related to. The search engine accesses the one or more massive indexes in order to obtain an ordered list of web pages that include the specified key words and symbols. The list of web-page results is ordered by various ranking metrics and statistical considerations, including the number of links directed to each page, the frequency and prominence of search terms in the page, and many other metrics and considerations, in order to first list the most promising candidate target web pages, with increasingly less promising candidate target web pages listed in decreasing order of promise.

The current web-page searching approach discussed with reference to FIG. 6, along with schemes for directing and ordering searches, in part in accordance with lees paid to search-engine companies by web-page providers, has proved enormously commercially successful for search-engine companies, and has provided an extremely useful tool to allow users of the Internet to find web pages related to topics and concepts of interest to the users. Search engines have revolutionized information access and information processing, providing immediate, electronic access to vast amounts of textural, graphical, audio, and video information stored within the worldwide web.

As discussed above, keyword-and-key-symbol-based searching has a number of shortcomings. First, keyword-and-key-symbol-based searching generally returns tens, hundreds, thousands, or more web pages with reasonably high, statistical correlation to input search terms. Keyword-and-key-symbol-based searching is therefore relatively imprecise, and often requires significant time and effort on the part of users to sift through and find desired web pages from massive returned search results. As users become more sophisticated, they learn techniques for relining and as precisely as possible specifying precisely as possible specifying desired web pages in terms of key words and key symbols. However, keyword-and-key-symbol-based searching is inherently limited by the inability to precisely define and characterize a topic or concept using a relatively small number of words and symbols.

A more serious problem encountered by search-engine users is that natural language, and, in particular, the English language, is quite redundant, with many different words and phrases that describe the same topic or concept. For this reason, any particular keyword-and-key-symbol-based search may omit a number of related and synonymous terms and symbols, and a search based on the key word and key symbols may therefore often find only a subset of the total number of related and desired web pages. To effectively search the worldwide web, the user often needs to conduct many repeated keyword-and-key-symbol-based searches, varying terms, symbols, and combinations of terms and symbols in order to find an acceptable subset of the set of web pages related to a particular topic or concept. Many additional problems are associated with keyword-and-key-symbol-based searching. While natural language is both redundant and ambiguous, leading to under-inclusive and over-inclusive search results, natural language is also a poor vehicle for capturing many complex concepts and interrelationships. It is often the case that a very large and cumbersome list of key words and key symbols may be needed to adequately describe a concept, but as the length of the key word and key-symbol list increases, the likelihood of finding web pages that include a significant portion of the key words and key symbols correspondingly decreases.

One way to view all of the above-discussed problems with keyword-and-key-symbol-based searching, as well as many additional problems with web browsing and information retrieval from the worldwide web, is that current search engines lack semantic understanding and semantic knowledge of the information contained within the worldwide web. While they are effective at using discrete words and symbols, and statistical relationships between discrete words and symbols, to find candidate web pages based on a list of key words and key symbols viewed as discrete entities, search engines do not index by the semantics of formatted natural language text, and they do not correlate their collection of words and symbols with a semantic representation of a topic, concept, or user request. This representation of a topic, concept, or user request. This underlying deficiency of current search engines has been recognized, and has stimulated a great deal of research on, and proposals for, new types of searching and new organizations and information-encodings for enhanced worldwide webs. Certain proposals are directed to tools for aggregating and processing unstructured worldwide-web-based information in order to more effectively use and search the unstructured information. Certain proposals are directed to more structured organizations of the worldwide web that would allow for more directed searches. These proposals include proposals for self-describing, more autonomous data objects that include extensive metadata to facilitate identifying relationships between data objects and automatic processing of the informational content of data objects. Still other proposals involved sophisticated natural-language processing and automated acquisition of semantic knowledge and semantic understanding of information encoded within the worldwide web.

Although many of the proposed enhancements and modifications of the worldwide web, and of searching techniques for finding web pages related to particular topics and concepts, have great merit, and may eventually lead to much better information organization and much more precisely directed searches for information contained within the worldwide web, there is a pressing need for immediate and practically implementable solutions to the various, above-described problems. Embodiments of the present invention are directed to methods and systems for constructing databases of concept objects that can be used to facilitate various aspects of web browsing, web-page searching, and other worldwide web-based activities that can lead to more effective, automated information acquisition and access based on the current, largely unstructured worldwide web.

Figure 7:
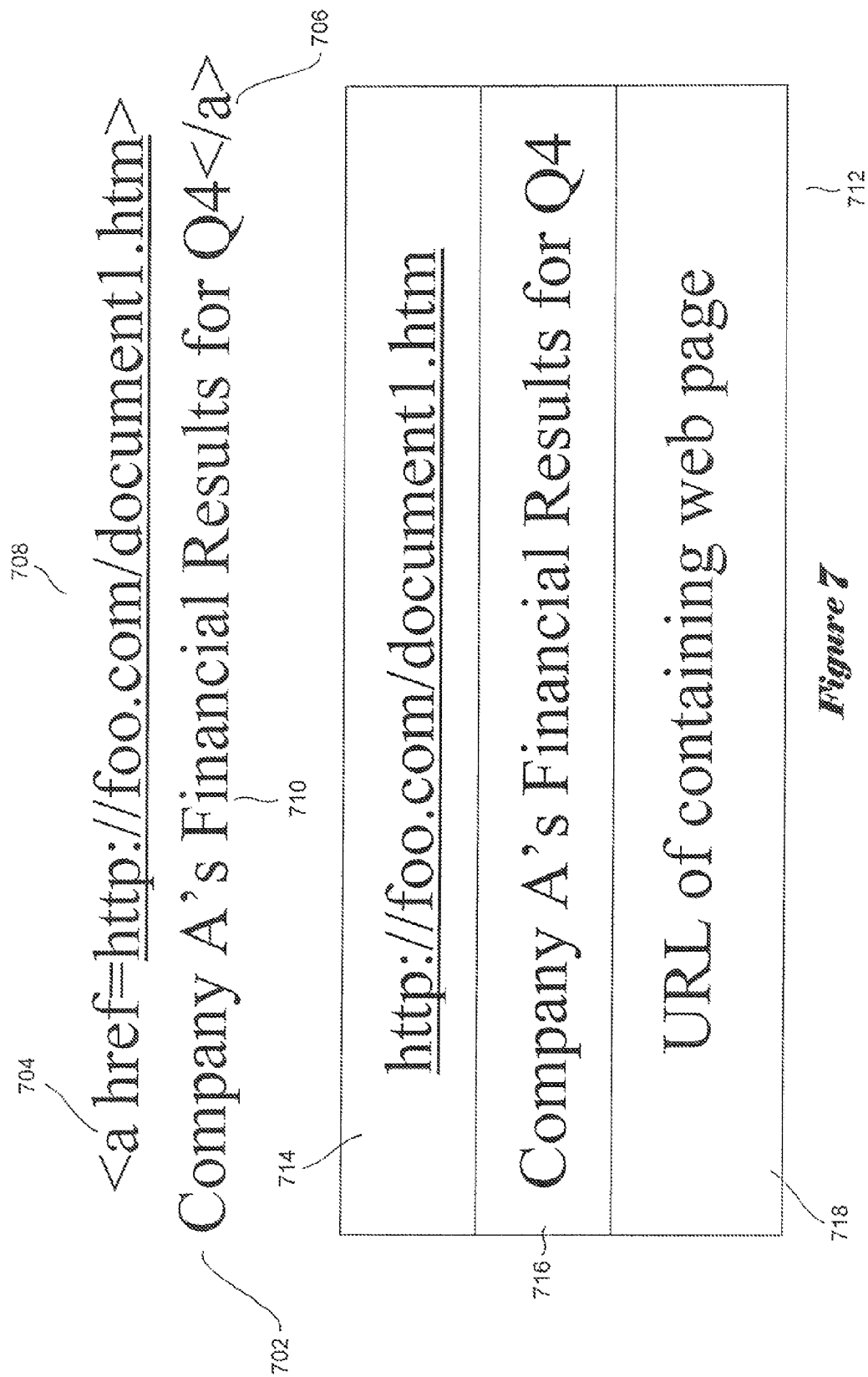
FIG. 7 illustrates creation of a raw hyperlink-based object according to method embodiments of the present invention.

FIG. 7 illustrates creation of a raw hyperlink-based object according to method embodiments of the present invention. As discussed above, a hyperlink displayed on a rendered web page is encoded within a text string in the HTML document that describes the web page. In FIG. 7, a representative hyperlink encoding 702 is shown. The text string is enclosed within an anchor tag identified by an initial "<a" 704 and a final "</a>" 706. The encoded hyperlink includes a reference URL 708 that specifies the HTML document describing a web page, and anchor text 710 that is rendered by a web browser to form the anchor text 710 that is rendered by a web browser to form the displayed hyperlink. A raw hyperlink-based object 712 can be considered to be a data object, or data record, with three fields: (1) a URL 714; (2) anchor text 716; and (3) the URL 718 of the web page from which the hyperlink was extracted. Thus, a raw hyperlink-based object encapsulates, or describes, a single hyperlink extracted from the HTML document describing a web page. It should be noted that, in some instances, anchor text represents a concise semantic-level description, or is at least semantically related to, the concept or topic represented by the referenced web page. Thus, anchor text may be a readily identified and accessed source of semantic information about the hyperlinks 708 that the anchor text is bound to within the largely unstructured information contained within the worldwide web. The relationship between the anchor text and the hyperlink comprises one possible permutation of a semantic object. Multiple instances of anchor text for the same link may be aggregated and normalized into sets of emergent terms and phrases that can be used to identify, tag, or semantically characterize the object.

Figure 8:
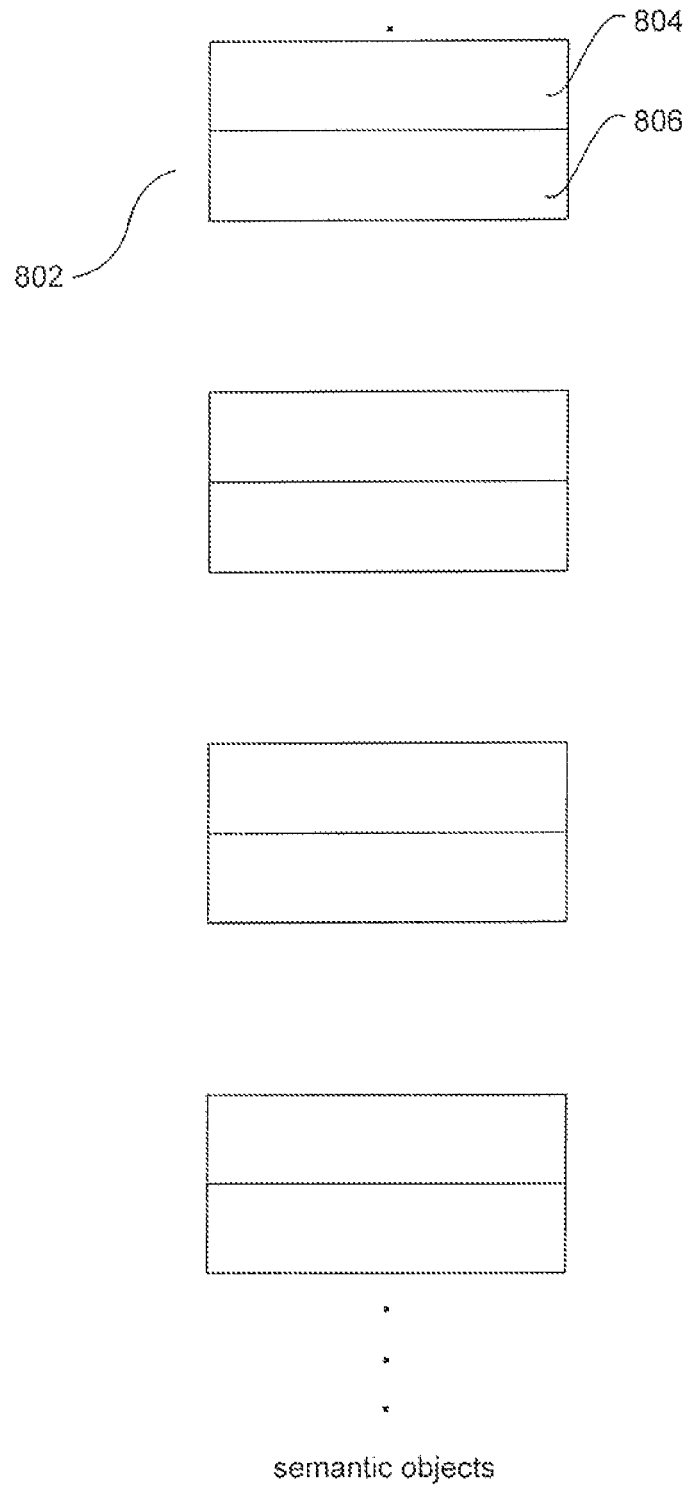
FIG. 8 illustrates semantic objects used by embodiments of the present invention to create a concept-object database.

FIG. 8 illustrates semantic objects used by embodiments of the present invention to create a concept-object database. In many embodiments of the present invention, semantic objects may be collected from various web sites that aggregate information obtained either from the worldwide web or from other sources, or may be compiled from various company web sites, directories, web catalogs, and other sources of compiled information, both electronically encoded and accessible or accessed by scanning printed media or by other means suitable to the encoding of the compiled information. Semantic objects may, in addition, be generated by web crawling and statistical analysis of hyperlink anchor text patterns, correlation/emergence of anchor text terms for specific URLs, and the numbers of hyperlinks to particular web pages.

A list of semantic objects, as shown in FIG. 8, represents a starting point for various method embodiments of the present invention. Each semantic object, such as semantic object 802, can be thought of as a data object or data record that includes two fields: (1) a URL 804; and (2) a list of emergent terms and phrases, or tags 806. In many embodiments, additional fields may be present in the semantic object, some of which may object, some of which may not, at early stages, have values, or may have default values that are changed during the processes described below. The URL is referred to as a "primary link." Each semantic object therefore is associated with a web page that may be referenced via the primary link and that is associated with, and described by, the emergent terms and phrases, or tags. For example, the home page of a corporate web site, such as "http://www.acme.com," may be described by a semantic object that includes the URL of the home page of the corporate web site and emergent terms, such as the phrase "Acme Corporation." In alternative embodiments, semantic objects may include additional fields, as well as a type field or type indicator, so that a list of semantic objects may include various sub-categories or sub-classifications of semantic objects and web pages represented by the semantic objects. For example, there may be corporate-web-page semantic objects corresponding to corporations, person semantic objects that describe particular people, research-article semantic objects that describe research articles, and any number of different types of semantic objects associated with different types of entities described by web pages. In many embodiments of the present invention, the acquisition of an initial list of semantic objects represents a first step in creation of a concept-object database.

Figure 9:
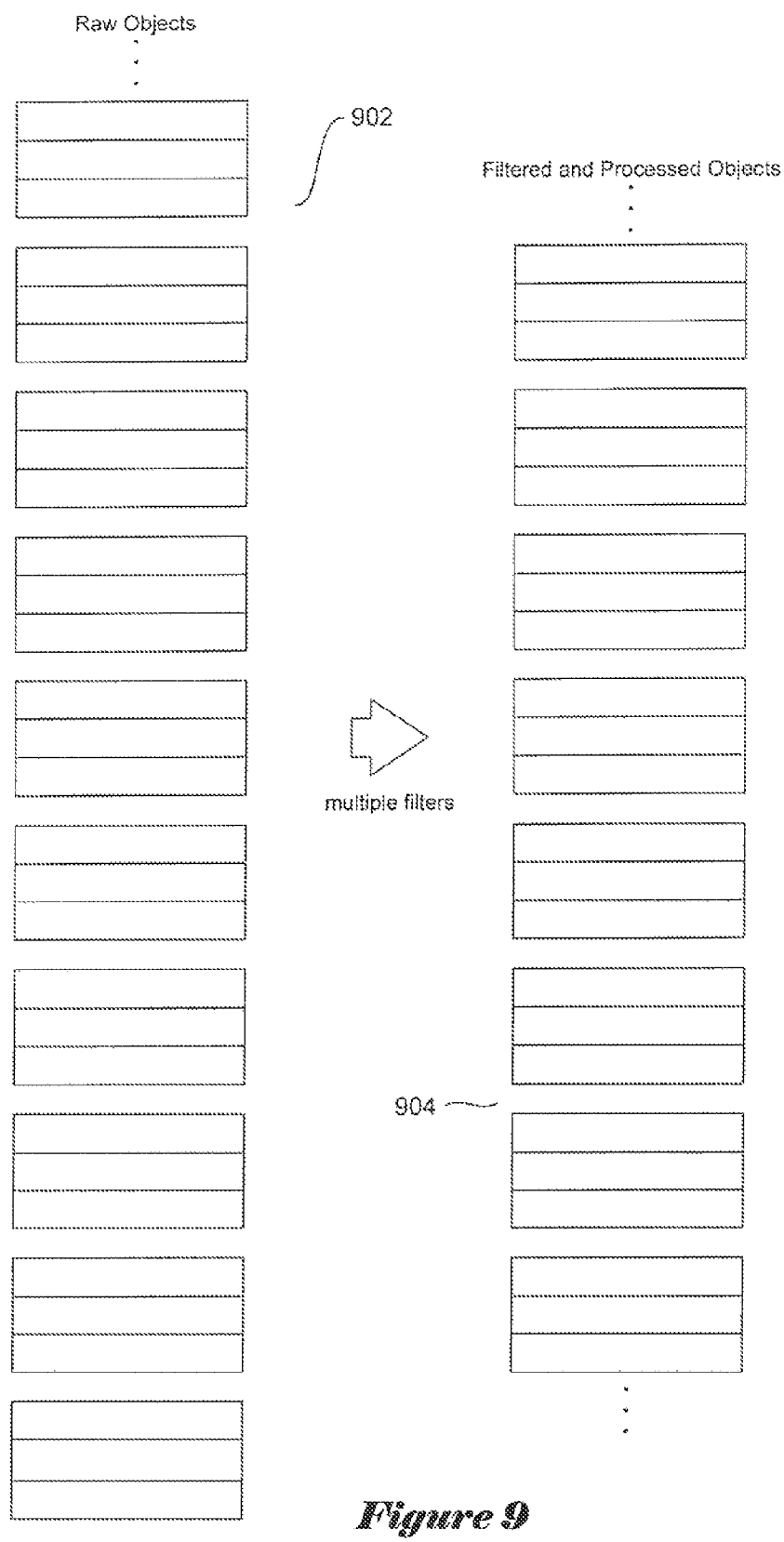
FIG. 9 illustrates second and third steps in concept-object-database creation according to method embodiments of the present invention.

FIG. 9 illustrates second and third steps in concept-object-database creation according to method embodiments of the present invention in many embodiments of the present invention, a second step in creating a concept-object database involves accessing as many worldwide web pages as possible, using one or more web crawlers, to extract hyperlinks from the accessed web pages. The extracted hyperlinks and anchor text may be stored in raw hyperlink-based objects 902 within a database. In a third step in many of these embodiments, the extracted raw hyperlink-based objects are then filtered and processed to produce a smaller set of filtered-and-processed hyperlink-based objects 904. Many different types of filtering and processing steps may be applied in order to generate the best possible set of candidate hyperlink-based objects for latter steps of concept-object-database creation. For example, raw hyperlink-based objects representing internal references, as described above with reference to FIG. 5, or self-references may be removed, since references representing external hyperlinks are often more semantically valuable. Another filter may may involve removing non-root-domain links to internal web pages within a web site, as well as redundantly included links within a website. Various processing steps may be used to process the anchor text that is included in the raw hyperlink-based objects. For example, anchor text may be processed to expand abbreviations, correct spelling errors, normalize case, remove punctuation, normalize to a particular natural language, normalize various linguistic derivatives of word stems to the base morphological form, and a variety of other linguistic processing steps. Additional examples of processing steps include converting various grammatical-forms, or hyphenated forms, of words to the underlying stem word, and perhaps adding common synonyms for words. Thus, the filtered-and-processed hyperlink-based objects obtained by the filtering and processing operations are normalized with respect to the anchor text and filtered to obtain a best candidate set of statistically and semantically meaningful hyperlinks. A portion of the filtering and processing may take place as a web crawler discovers and extracts hyperlinks from accessed web pages. Another portion of the filtering and processing steps may be taken following construction, by one or more web crawlers, of an initial database of raw hyperlink-based objects 902. For example, a web crawler may easily detect internal hyperlinks within websites, or relative hyperlinks, as the web crawler traverses a web site, since relative hyperlinks often lack an IP/Server component. In general, a particular filter or processing step is carried out at the point where it can be most efficiently carried out.

Figure 10:
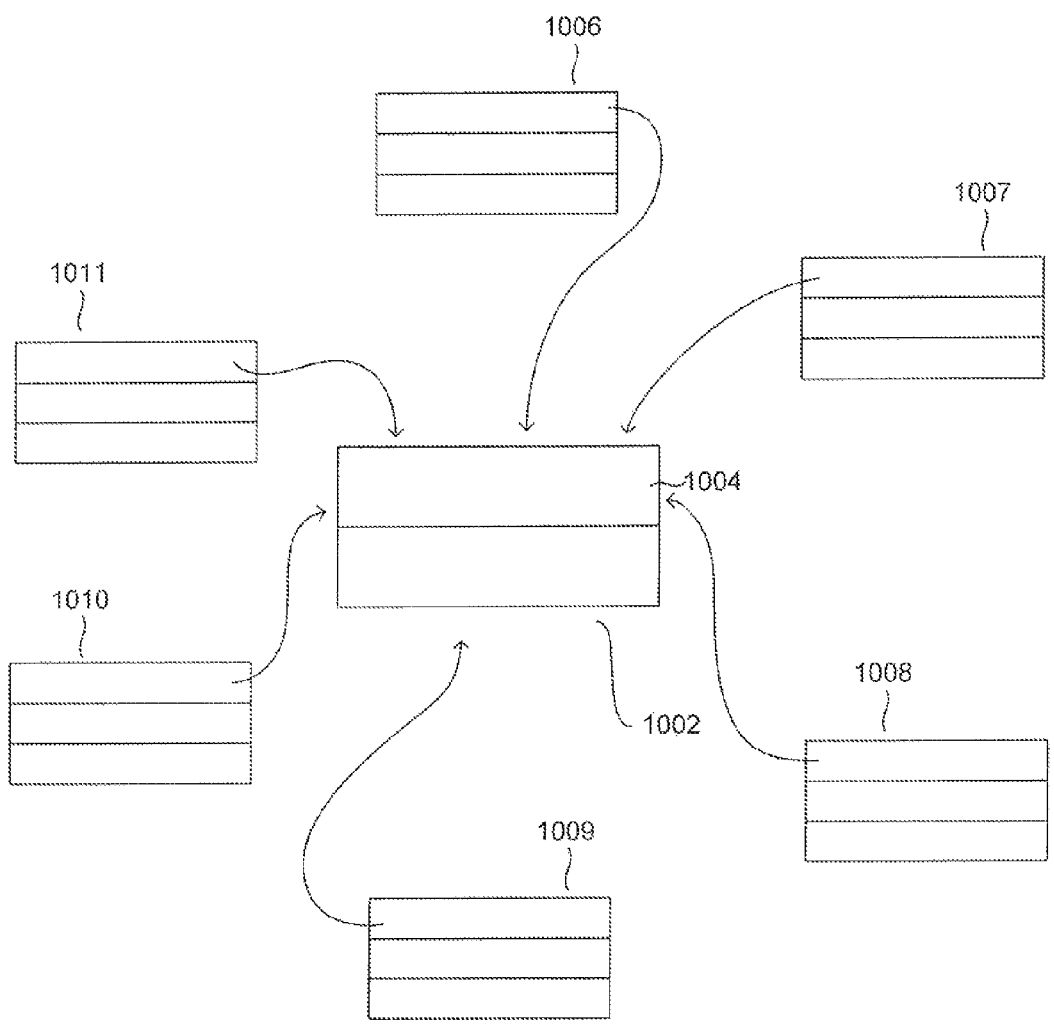
FIG. 10 illustrates a fourth step carried out in many embodiments of the present invention during creation of a concept-object database.

FIG. 10 illustrates a fourth step carried out in many embodiments of the present invention during creation of a concept-object database. In this fourth step, each semantic object 402 in the semantic-object database discussed above with reference to FIG. 8 is separately considered in an iterative process. For each considered semantic object, all filtered-and-processed hyperlink-based objects in the filtered-and-processed-hyperlink-based-object database (904 in FIG. 9) that contain a URL reference (first field in the hyperlink-based object data structure embodiment discussed above with reference to FIG. 7) equal to the primary-link URL 404 contained in the first field of the considered semantic object are found in the filtered-and-processed-hyperlink-object database and associated with the considered semantic object 402. These associated filtered-and-processed hyperlink-based object 402. These associated filtered-and-processed hyperlink-based objects are used in subsequent steps, discussed below, that affect filtering and processing of semantic objects. In other words, each semantic object in the semantic-object database is considered in the context of the filtered-and-processed hyperlink-based objects that reference the web page represented by the semantic object. The filtered-and-processed-hyperlink-object context is used to determine, in certain embodiments, whether or not to delete a considered semantic object from the semantic-object database and is generally used for processing, in the case that the considered semantic object remains in the semantic-object database, the semantic object.

Figure 11:
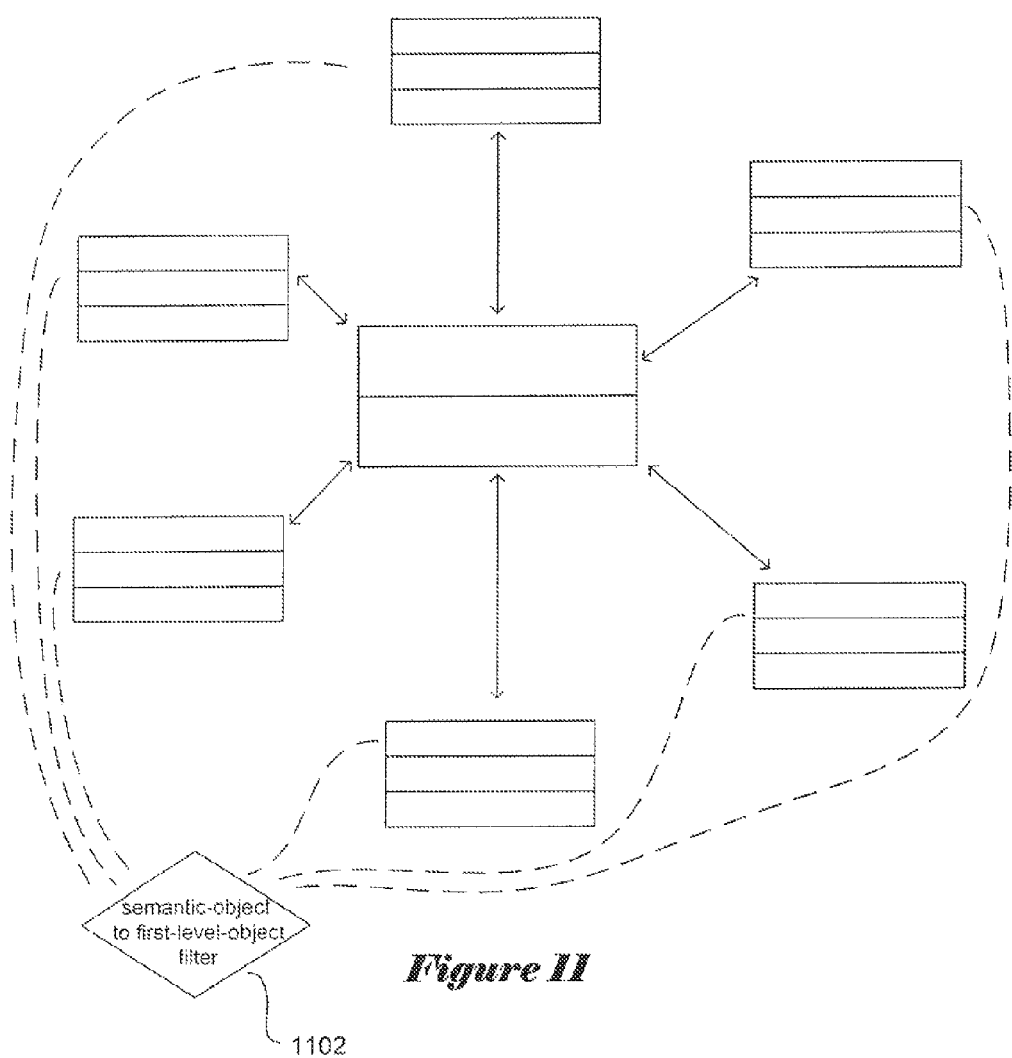
FIG. 11 illustrates a first consideration, made in certain embodiments of the present invention, as to whether to retain a semantic object within the semantic-object database or to instead delete the semantic object from the semantic-object database.

FIG. 11 illustrates a first consideration, made in certain embodiments of the present invention, as to whether to retain a semantic object within the semantic-object database or to instead delete the semantic object from the semantic-object database. A semantic object may be removed from the semantic-object database for lack of significant reference from other web pages within the worldwide web, because of detected flaws or other errors, and for a variety of other reasons. This first consideration is illustrated in FIG. 11. An analysis of the number and characteristics of filtered-and-processed hyperlink-based objects associated with the considered semantic object is undertaken in order to determine 1102 whether or not the considered semantic object should be retained in the database. The decision may be based on a threshold number of associated hyperlink-based objects needed in order to retain the semantic object. Additional considerations may be based on the characteristics of associated hyperlink-based objects, including patterns and distributions of the associated hyperlink-based objects within the worldwide web, and also interrelationships between the associated filtered-and-processed hyperlink-based objects. Further considerations may involve ascertaining the integrity and robustness of the semantic object and detecting flaws in the semantic object.

Figure 12:
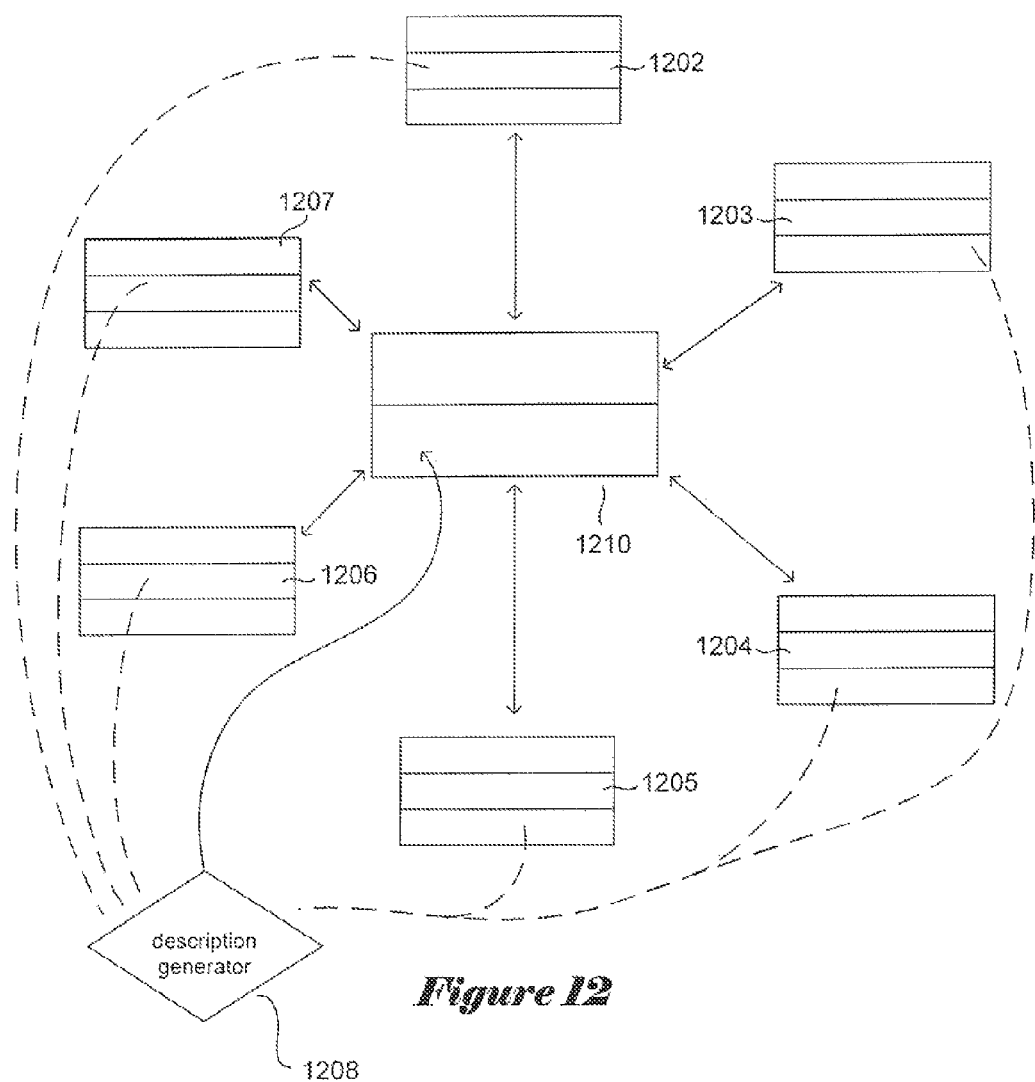
FIG. 12 illustrates the processing of a first-level object according to certain embodiments of the present invention.

First-level objects are nascent concept objects that are identified as being significantly well referenced by web pages within the worldwide web and that have been well described by a title comprising terms and symbols obtained by statistical analysis of anchor text within the associated filtered-and-processed-hyperlink-object context of the first-hyperlink-object context of the first-level object. In the case that is decided to retain the currently considered semantic object, the currently considered semantic object is promoted to a "first-level object" and the first-level object is then additionally processed in the context of the associated filtered-and-processed hyperlinks. FIG. 12 illustrates the processing of a first-level object according to certain embodiments of the present invention. Anchor text contained in the associated filtered-and-processed hyperlinks is statistically analyzed in order to determine a dominant or prominent set of terms and symbols, referred to as "emergent terms." The processing steps 1208 are thus mainly directed to associating a hyperlink-based object with emergent terms most descriptive of the first-level object 1210, and updating the first-level object to associate the first-level object with the emergent terms. When the iterative filtering and processing of semantic objects within the context of associated filtered-and-processed hyperlink-based objects is complete, a database of first-level objects is obtained. These first-level objects are nascent concept objects that are identified as being significantly well referenced by web pages within the worldwide web and that have been well described by a title comprising terms and symbols obtained by statistical analysis of anchor text within the associated filtered-and-processed-hyperlink-object context of the first-level object.

Figure 13:
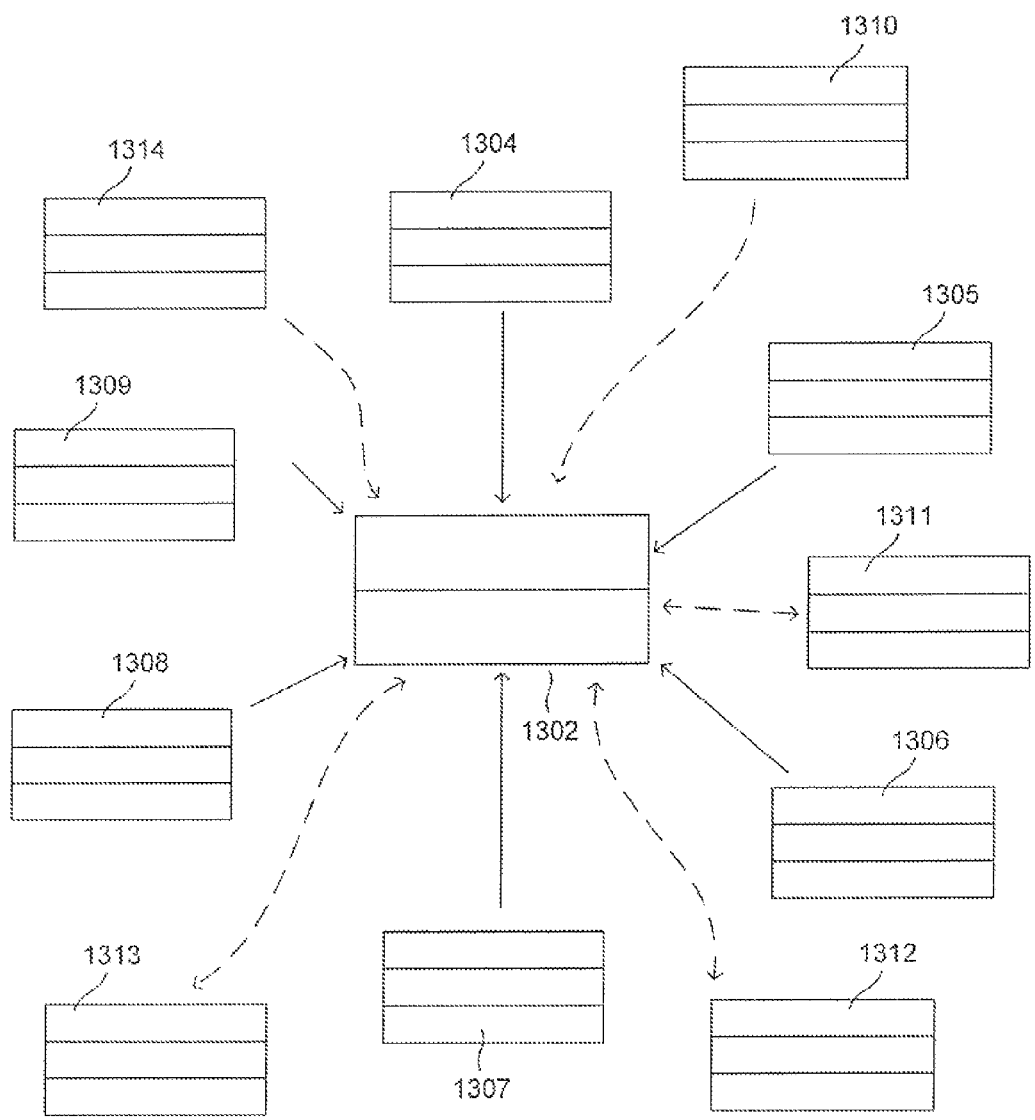
FIG. 13 illustrates a next-considered first-level object in a second iterative processing step in which each first-level object is again considered within the context of related filtered-and-processed hyperlink-based objects.

Next, a second iterative procedure can be carried out in which each first-level object is again considered, in the second iterative process within the context of related filtered-and-processed hyperlink-based objects. Related filtered-and-processed hyperlink-based objects include not only filtered-and-processed hyperlink-based objects that directly reference the considered first-level object, but, in addition, those filtered-and-processed hyperlink-based objects with anchor text related to the emergent terms by which the considered first-level object is tagged. FIG. 13 illustrates a next-considered first-level object in a second iterative processing step considered within the context of related filtered-and-processed hyperlink-based objects. As shown in FIG. 13, the currently considered first-level object 1302 is related to a set of filtered-and-processed hyperlink-based objects 1304-1309 that directly reference the currently considered first-level object 1302, and is also related to a second set of filtered-and-processed hyperlink-based objects 1310-1314 with 1314 with normalized anchor text related to the emergent terms by which the currently considered first-level object is tagged. A determination of the relatedness of normalized anchor text to a first-level object's emergent terms may be made by matching and terms and symbols in the anchor text with the terms and symbols by which the first-level object is tagged. Additional considerations related to statistical orderings and rankings of terms and symbols may be made.

Having established, for each currently considered first-level object, the filtered-and-processed-hyperlink-object context as shown in FIG. 13, the currently considered first-level object may be then additionally processed and promoted to a concept object. Additional processing may involve refining the first-level object's emergent terms using normalized anchor text in the expanded context of filtered-and-processed hyperlink-based objects. In certain embodiments, the context may be additionally expanded to include the web pages from which the filtered-and-processed-hyperlink-based objects were extracted in order to add additional information to the first-level objects. For example, when first-level objects are classified by type, the values for additional type-specific fields may be determined at this stage of the process. As one example, if the first-level object represents a literary work, the first-level object may include additional fields for author, publisher, and publication date. The values for these fields may be obtained from the web pages from which the filtered-and-processed-hyperlink-based objects associated with the first-level object were extracted and/or from the web page referenced by the primary link contained in the first-level object, or from other sources.

Next, a decision is made for each filtered-and-processed hyperlink-based object within the expanded context of the first-level object as to whether the filtered-and-processed hyperlink-based object should be associated with the first-level object by a secondary link. This decision may be based on a large variety of different considerations and on various types of accumulated data. For example, the decision to create a secondary link between the first-level object and a filtered-and-processed hyperlink-based object may, in part, be based on the uniqueness of any proper names in the anchor text of the hyperlink-based object that match proper names in the emergent terms associated with the concept object. Statistical rankings and orderings of common anchor-text and object-associated of common anchor-text and object-associated terms and symbols may additionally be employed to judge the relatedness and the value of the hyperlink to the first-level object. In more elaborate embodiments, web pages from which the hyperlink-based objects are extracted may be accessed and analyzed to further characterize the relatedness and value of the hyper-link-based object to the first-level object. Finally, the first-level object is promoted to a concept object and stored in the concept-object database, along with secondary links to related hyperlink-based objects deemed to be of sufficient relatedness in value to be associated with the concept object in a concept-object database.

Figure 14:
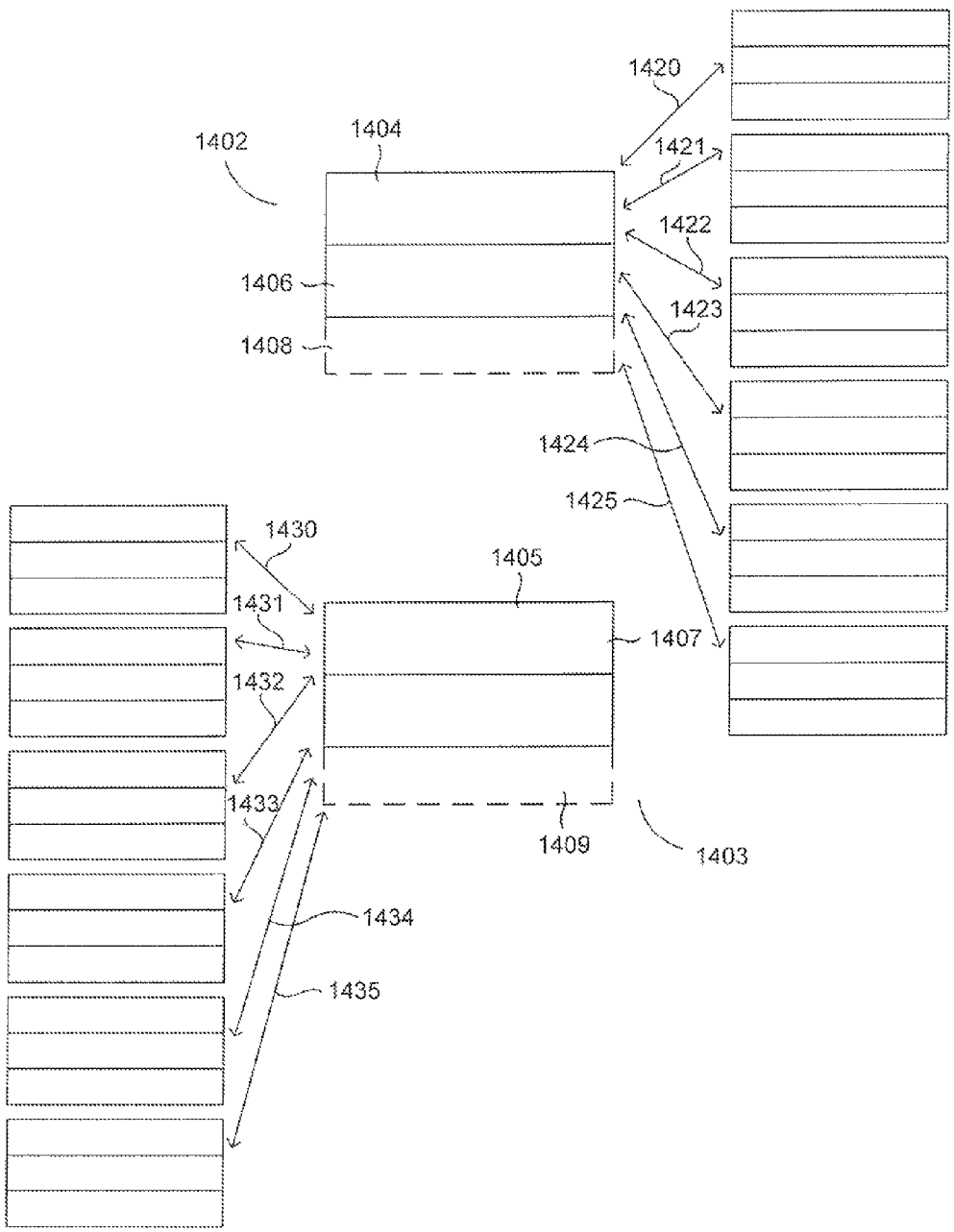
FIG. 14 illustrates two concept objects and associated secondary links within a concept-object database that represents an embodiment of the present invention.

FIG. 14 illustrates two concept objects and associated secondary links within a concept-object database that represents an embodiment of the present invention. Each concept object 1402 and 1403 includes the primary link 1404-1405, or URL, for the web page represented by the concept object, a refined set of emergent terms 1406-1407, and any additional fields and parameters 1408-1409 added during the process in which first-level objects are promoted to concept objects. In addition, each concept object 1404 and 1405 is associated with a set of secondary links 1420-1425 and 1430-1435, respectively, to filtered-and-processed hyperlink-based objects.

Details of the exact schemas and database systems and models for storing semantic objects, hyperlink-based objects, and concept objects are not provided in the current discussion for a number of reasons. First, databases and database schemas for storing relatively simple, multi-field data records or data objects are extremely well known. Relational databases, for example, are well known to be suitable for storing and query-based retrieval of simple data objects. Secondly, there are an essentially limitless number of different schemas and models that can be devised for storing semantic objects, hyperlink-based objects, and concept objects. For example, a concept-object database may include relational tables for concept objects, hyperlink-based objects, and secondary links. Alternatively, a concept-object database may be based on an object-oriented database in which stored concept objects reference stored hyperlink-based objects. Whatever the database model and schema used, it is assumed that a selection of efficient searching tools are provided by the database that allow for efficiently and precisely finding particular concept objects and hyperlink-based objects related to concept objects through secondary hyperlink-based objects related to concept objects through secondary links. In the above described concept-object-database creation method, a set of semantic objects is transformed into a set of first-level objects, in turn transformed into a database containing concept objects. Semantic objects may be stored separately from first-level objects, and first-level objects maybe stored separately from concept objects. Alternatively, all three types of objects may share a common representation and be stored in a single object database, and the process of concept-object-database creation may comprise augmenting and refining the contents of the objects and filtering the set of objects to remove undesirable objects from the object database. Filtered-and-processed hyperlink-based objects may be stored separately from, or together with, semantic objects, first-level objects, and/or concept objects. Rather than storing objects in a database, the objects may be stored in indexed flat files, or using other well-know techniques for storing data for subsequent access.

Figure 15:
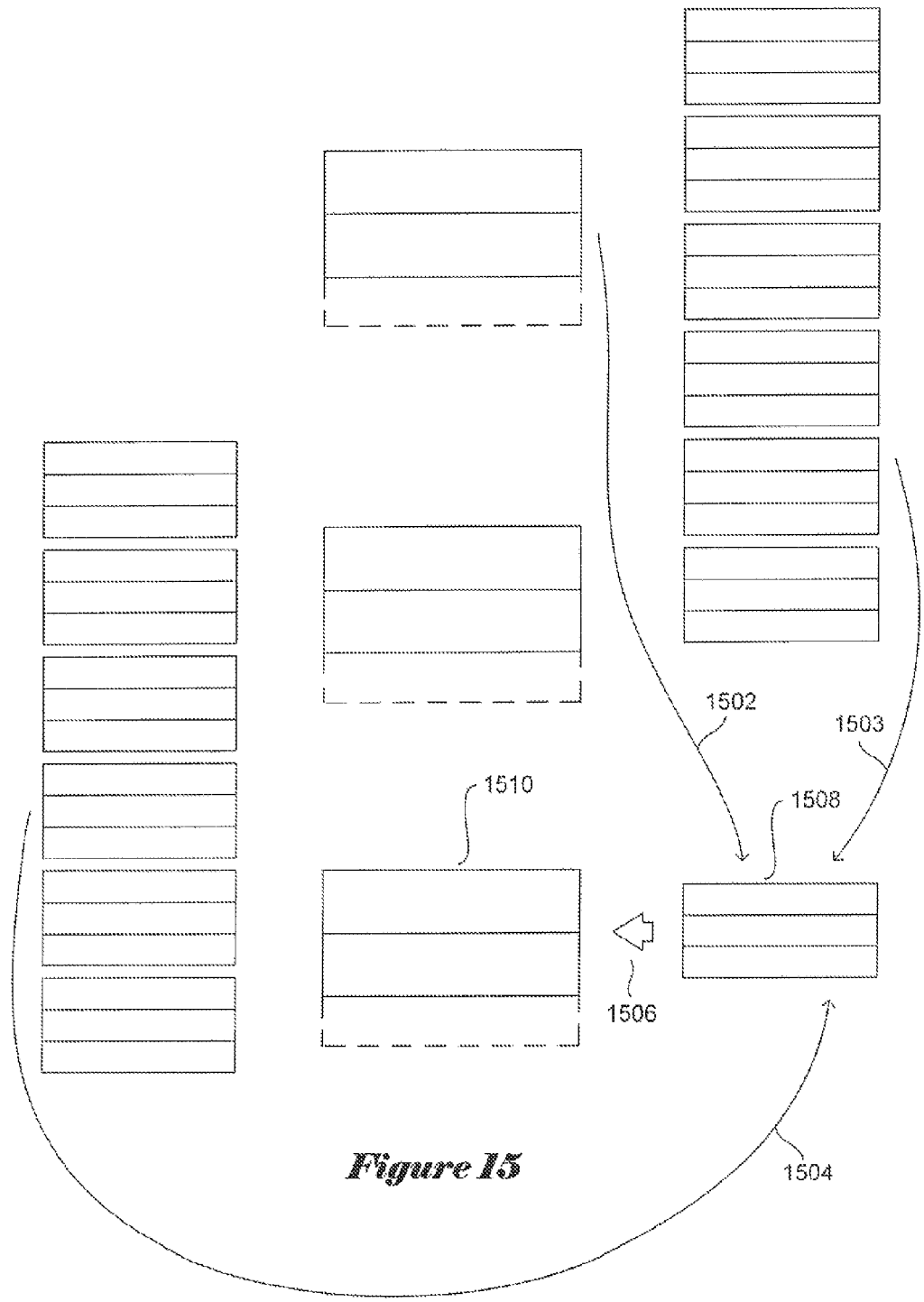
FIG. 15 indicates one type of concept-object-database enhancement carried out in certain embodiments of the present invention.

The initial concept-object database may be further refined and supplemented at subsequent points in time, or may be continuously refined and supplemented. FIG. 15 indicates one type of concept-object-database enhancement carried out in certain embodiments of the present invention. As shown in FIG. 15, tertiary links 1502-1504 that link concept objects and hyperlink-based objects to other hyperlink-based objects may be obtained from web pages associated with the concept objects and hyperlink-based objects, and analysis of the tertiary links may lead to a decision to promote 1506 a particular hyperlink-based object 1508 to a first-level object and perhaps to a concept object 1510. This may provide for addition of concept objects, over time, to the concept-object database. Alternatively, various sources of semantic objects may be monitored in order to create, on an ongoing basis, additional semantic-object databases that can be merged, using a process such as that discussed above with reference to FIGS. 7-14, with the original concept-object database. As filtered-and-processed hyperlink-based objects are discovered and added to subsequent filtered-and-processed-hyperlink-object databases, these subsequent hyperlink-object databases may be used to further refine concept objects in the concept-object database, by refining the emergent terms associated with the concept object and additional fields of the concept object, by adding additional fields to the concept object, and by adding additional to the concept object, and by adding additional secondary links to subsequently discovered filtered-and-processed hyperlink-based objects. Over time, meta-level objects that each represents a subset of the concept object stored in the concept-object database may be created and stored, in a meta-level object database or relational table, to provide additional indexes into the concept-object database. In alternative embodiments, users of a concept-object database, or of web browsers or search engines that use one or more concept-object database, may be provided tools to edit, add, and delete concept objects directly, or indirectly by providing information that is processed and used to edit, add, and delete concept objects by an automated process.

Figure 16:
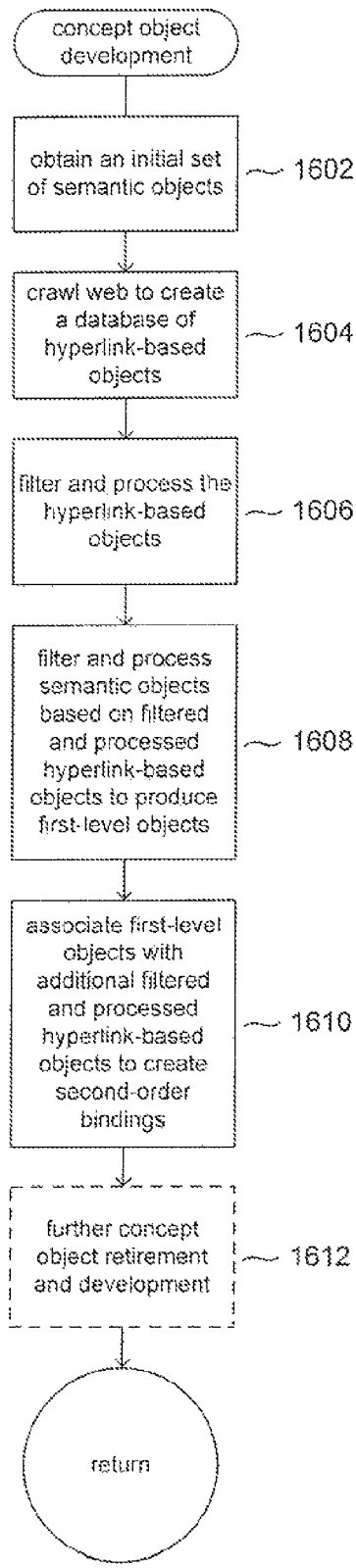
FIG. 16 is a control-flow diagram that summarizes concept-object-database development, discussed above with reference to FIGS. 7-15, that represents an embodiment of the present invention.

FIG. 16 is a control-flow diagram that summarizes concept-object-database development, discussed above with reference to FIGS. 7-15, that represents one embodiment of the present invention. In step 1602, an initial set of semantic objects is obtained. In step 1604, the worldwide web is crawled by one or more web crawlers to create a database of raw hyperlink-based objects, as discussed above with reference to FIG. 9. In step 1606, the raw hyperlink-based objects are filtered and processed, as discussed above with reference to FIG. 9. In step 1608, the initial set of filtered-and-processed semantic objects within a semantic-object database, discussed above with reference to FIG. 8, is filtered and processed to produce a database, or set, of first-level objects, as discussed above with reference to FIGS. 10-12. Then, in step 1610, the first-level objects are iteratively processed to refine the contents of the first-level objects and create a set of secondary links between hyperlink-based objects and the first-level objects, resulting in promotion of first-level objects to concept objects that are stored in a concept-object database. In a number of different possible optional subsequent steps 1612, the initial concept-object database may be refined and supplemented by subsequent, discrete steps or by an ongoing, continuous refinement and concept-object-addition process. While various automated refinement and supplementation processes may be used, either at discrete points in time or on an ongoing basis, additional types of refinement, concept-object addition, concept-object deletion, hyperlink-object addition, and hyperlink-object deletion may be carried out by users in a distributed concept-object-database editing process, much like the Wikipedia on-line encyclopedia is continuously updated and refined by a large community of Wikipedia authors continuously updated and refined by a large community of Wikipedia authors and users.

Next, a simple Java-like pseudocode implementation of a concept-object-database creation process is provided. The function "bindLinksToObjects" within the class "Binder," provided below, carries out a process of binding semantic objects to secondary links, using data structures and filtering and processing steps similar to those discussed above with reference to FIGS. 7-16.

```
1  public class Binder
2  {
3       public static int s_fetchSize = 1000;
4       public void setFetchSize(int fetchSize) {
5          s_fetchSize = fetchSize;
6       }
7       /**
8        * @param store      to access objects and bind links.
9        * @param crawler    contains basic information about
10       *                    links and anchor text
11       * @param linkFilter applies criteria to extract links.
12       * @param textFilter applies criteria to extract text.
13       * @throws Exception on error
14       */
15      public void bindLinksToObjects(DataStore store,
16                                     Crawler crawler,
17                                     LinkFilter linkFilter,
18                                     TextFilter textFilter)
19                                     throws Exception
20      {
21         int startID = 0;
22         SemObject objs[ ] = null;
23         boolean keepGoing = true;
24         while(keepGoing == true) {
25            objs = store.dumpObjects(startID,s_fetchSize);
26            if(objs.length > 0) {
27               for(SemObject obj : objs) {
28                  List<String> identifiers;
29                  identifiers = generateIdentifiers(obj,
30                                     crawler, textFilter);
31                  store.bindObjectToIdentifiers
32                                     (obj,identifiers);
33                  List<Link> links =
34                     getMatchingAnchorTextLinks(obj,crawler,
35                                     identifiers,linkFilter);
36                  store.bindObjectToLinks(obj,links);
37               }
38               startID += objs.length;
39            }
40            else {
41               keepGoing = false;
42            }
43         }
44      }
   ....
45 }
```

The function "bindObjectToLinks" begins on line 15 of the class "Binder." The function "bindObjectToLinks" receives, as parameters, a data store, a crawler, a link filter, and a text filter. Following local-variable initializations on lines 21-23, the function "bindObjectToLinks" iteratively executes the while-loop of lines 24-43. In each iteration of the while-loop, on line 25, a next batch of semantic objects is retrieved from the data store. If one or more objects are retrieved, then the for-loop of lines 27-37 is executed. A next semantic object is considered in each iteration of the for-loop. On lines 29-30, a list of text identifiers from the normalized anchor text of all of the filtered-and-processed hyperlink-based objects linked directly to the currently considered semantic object is obtained via a call to the function "generateIdentiliers." Then, on lines 31-32, the identifiers are bound to the currently considered semantic object as emergent terms, promoting the currently considered semantic object to a first-level object. Next, on lines 33-35, secondary links to hyperlink-based objects that do not directly reference the currently considered semantic object are obtained, and, on line 38, the secondary links are bound to the first-level object to create a concept object.

An interface for the type "SemObject" that represents a semantic object is next provided:

```
public interface SemObject {
    public String [ ] getIdentifiers( );
    public List<Link> getPrimaryLinks( );
    public List<Link> getSecondaryLinks( );
}
class SemObjectImpl implements SemObject {
    private List<Link> _primaryLinks;
    private List<Link> _secondaryLinks;
    private List<String> _identifiers;
    public List<Link> getPrimaryLinks( )
    {
        return _primaryLinks;
    }
    public String [ ] getIdentifiers( ) {
        String ids[ ] = new String[_identifiers.size( )];
        ids = (String[ ])_identifiers.toArray(ids);
        return ids;
    }
    public List<Link> getSecondaryLinks( ) {
        return _secondaryLinks;
    }
    void setIdentifiers(List<String> identifiers) {
        _identifiers = identifiers;
    }
    void setPrimaryLinks(List<Link> links) {
        _primaryLinks = links;
    }
    void setSecondaryLinks(List<Link> links) {
        _secondaryLinks = links;
    }
}
```

On lines 29-30 of the above-discussed routine "bindObjectToLinks," text identifiers for creation of a list of emergent terms for a semantic object are obtained from the filtered-and-processed hyperlink-based objects that directly reference the semantic object. This is accomplished by the routine "generateIdentifiers," provided below, which, in turn, relies on the crawler routine "getAnchorText," provided as part of the crawler interface, to access and filer hyperlink-based objects that directly reference the semantic object and to filter anchor text obtained from the filtered hyperlink-based objects:

```
private List<String> generateIdentifiers
                 (SemObject obj,Crawler crawler,TextFilter
                        textFilter) throws Exception
{
   List<String> identifiers =
      crawler.getAnchorText(obj.getPrimaryLinks( ),
                                        textFilter);
return identifiers;
}
public interface Crawler {
   List<String> getAnchorText(List<Link> links);
   List<Link> getMatchingLinks(String identifier,LinkFilter
                                        linkFilter);
}
public interface TextFilter {
```

-continued

```
    public List<String> applyFilter(List<String> allText);
}
```

On lines 33-35 of the above-described routine "bindObjectsToLinks," secondary links are identified and extracted from a set of filtered-and-processed hyperlink-based objects related to a currently considered semantic object via the routine "getMatchingAnchorTextLinks." An implementation of the routine "getMatchingAnchorTextLinks," called on lines 33-35 is next provided:

```
private Link [ ] getMatchingAnchorTextLinks(SemObject obj,Crawler
crawler,
        List<String> identifiers, LinkFilter linkFilter) {
        List<Link> linkList = new ArrayList<Link>( );
        List<Link> returnedLinks = null;
        Link links[ ] = null;
        for(String identifier : identifiers) {
            returnedLinks =
                crawler.getMatchingLinks(identifier,linkFilter);
            linkList.addAll(returnedLinks);
        }
        links = new Link[linkList.size( )];
        links = (Link [ ])linkList.toArray(links);
        return links;
}
```

This implementation of crawler getMatchingLinks calls the routine "applyFilter," to filter the original list of links, a declaration for which is provided below:

```
public interface LinkFilter {
    public List<Link> applyFilter(String identifier,List<Link> links);
}
```

Figure 17:
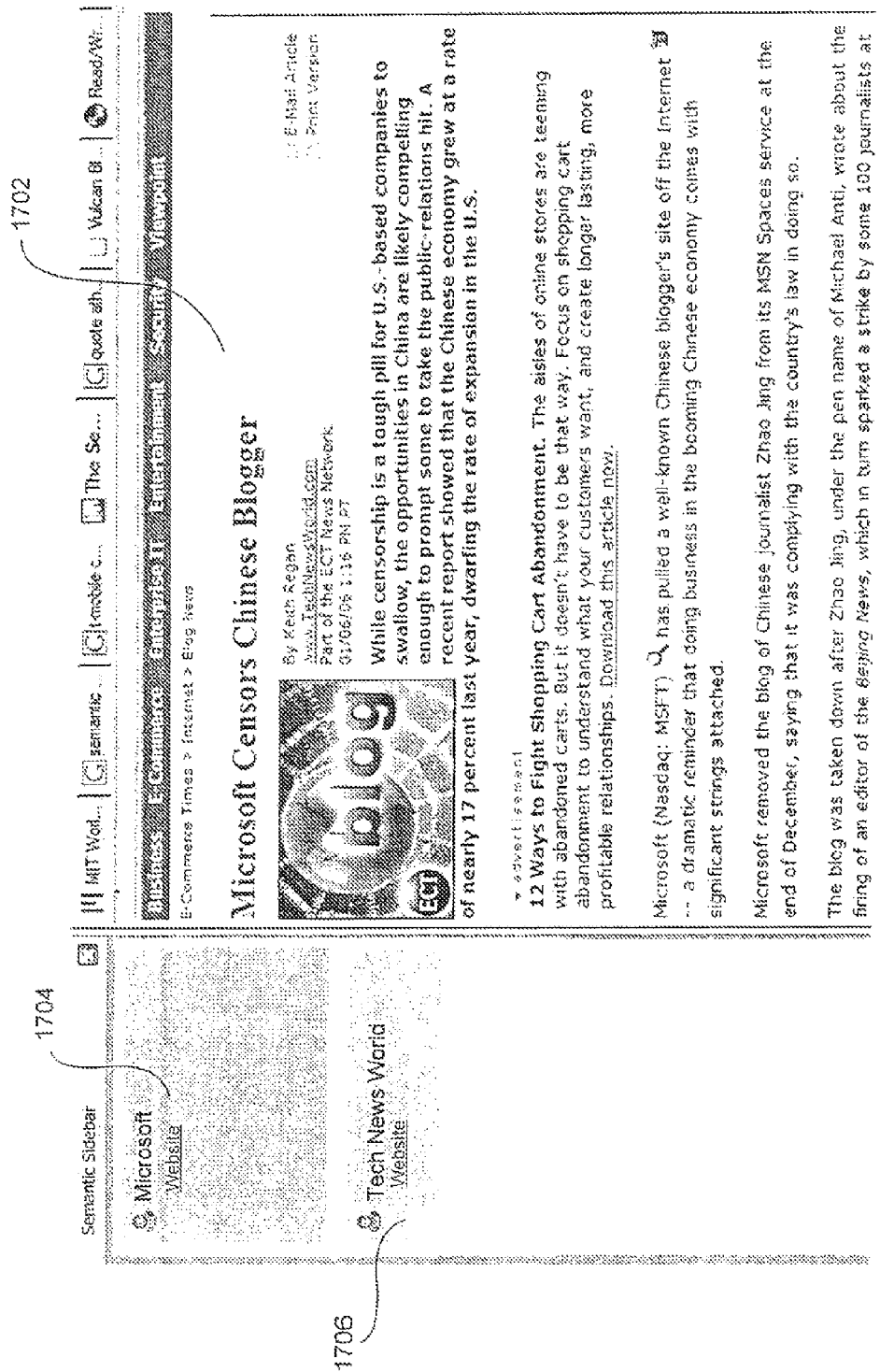
FIG. 17 illustrates an enhanced web browser with a semantic sidebar according to an embodiment of the present invention.

A concept-object database provides a foundation for enhancing web browsing and web-page searching methods and systems to provide semantics-directed browsing and searching rather than keyword-and-key-symbol-based browsing and searching. FIG. 17 illustrates an enhanced web browser with a semantic sidebar according to an embodiment of the present invention. When a user requests and renders a web page 1702 using the enhanced browser, the enhanced browser displays a display version of the concept object, and may also display additional links 1704 and 1706 to web pages described by concept objects related by secondary links to the displayed web page 1702. Thus, a user is automatically provided navigational tools, by displaying any particular web page, to related web pages described by concept objects within the concept-object database.

Figure 18:
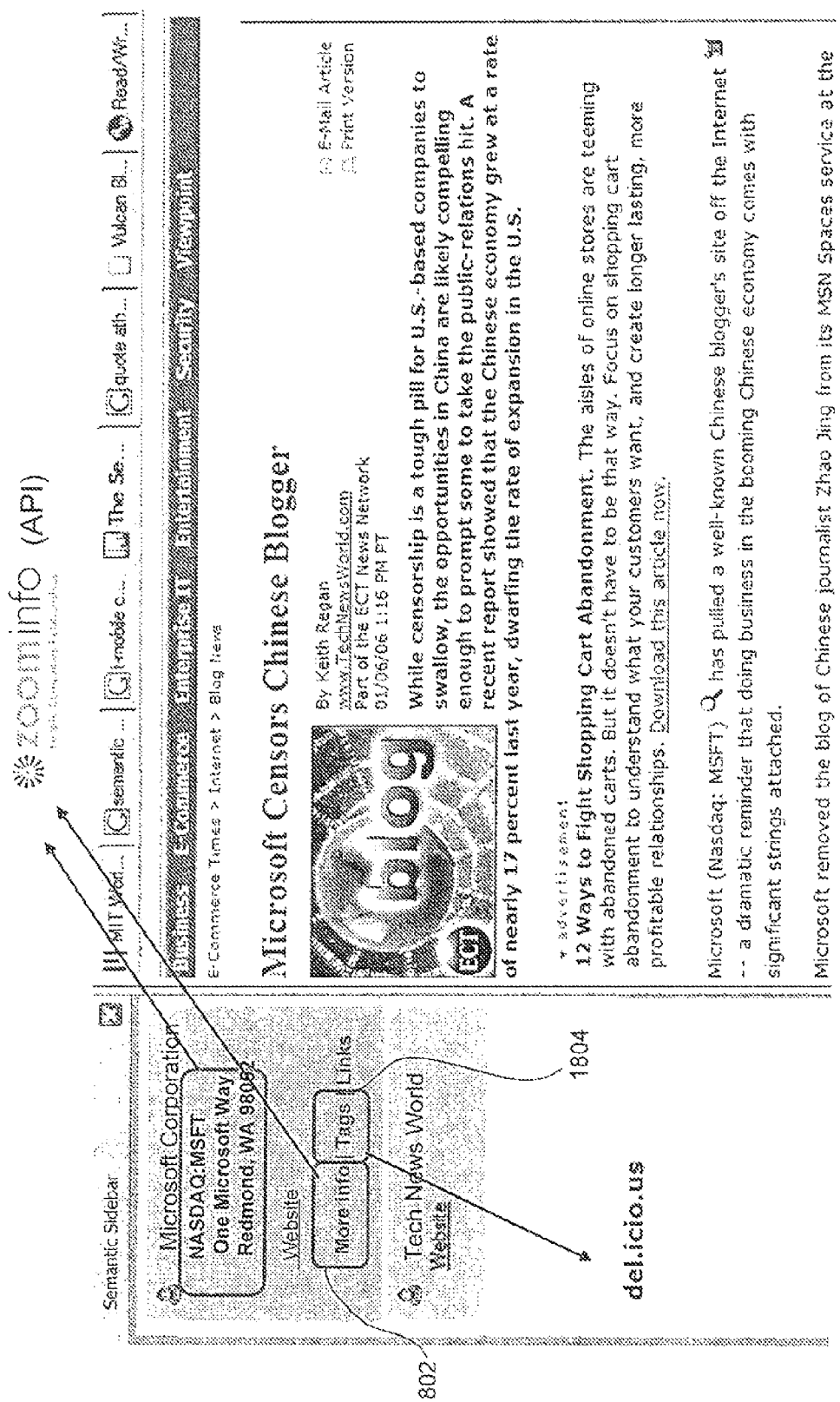
FIG. 18 shows the enhanced web browser of FIG. 17 with additional annotation, and with enhancements to displayed links referencing web pages represented by concept objects, according to an embodiment of the present invention.

Presumably, the concept objects allow a user to find web pages and information that is semantically related to the displayed web page. FIG. 18 shows the enhanced web browser of FIG. 17 with additional annotation, and with enhancements to displayed links referencing web pages represented by concept objects, according to an embodiment of the present invention. The "More info" 1802 and "Tags" 1804 input features allow a user to navigate to additional web sites providing compiled information about the concept or topic related to the displayed concept-object link to a corporation website.

Figure 19:
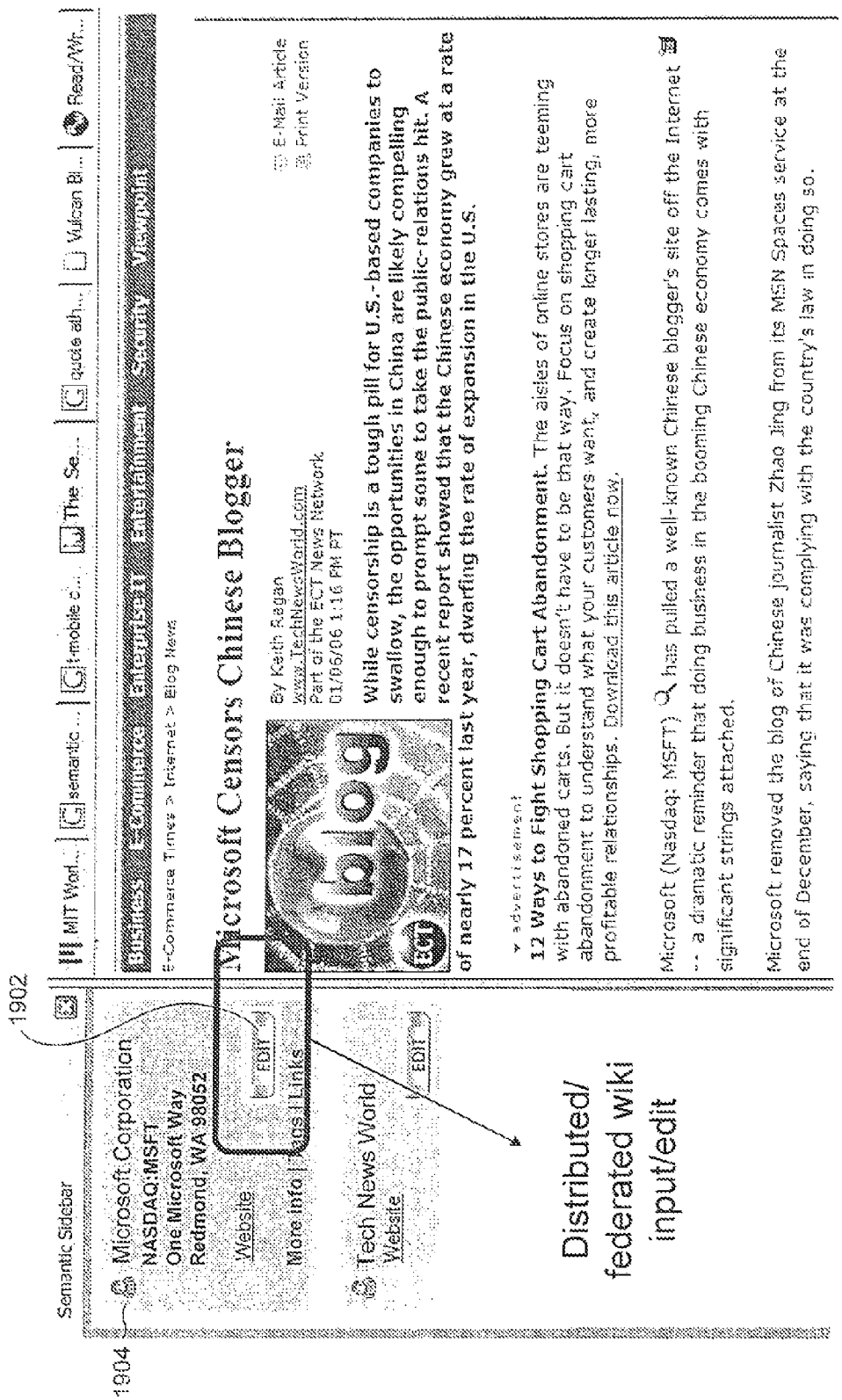
Figure 20:
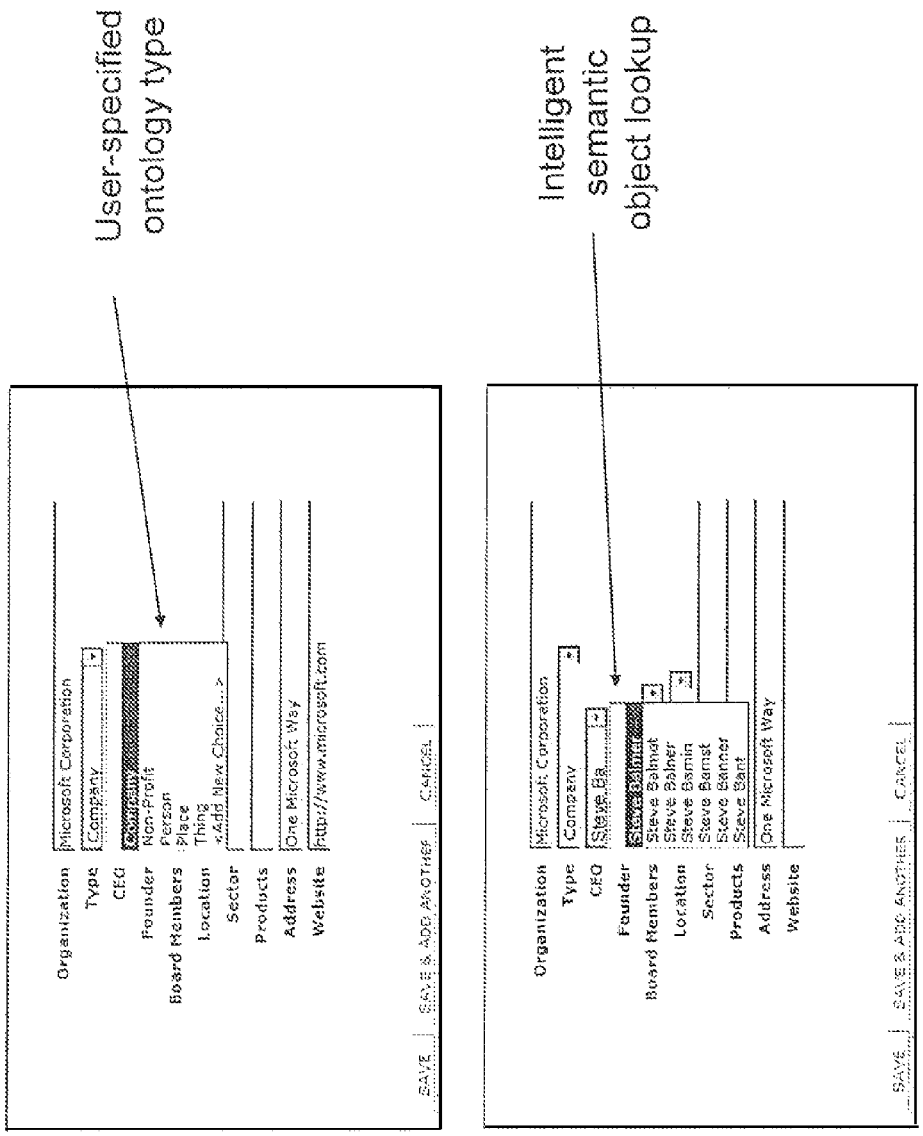
Figure 21:
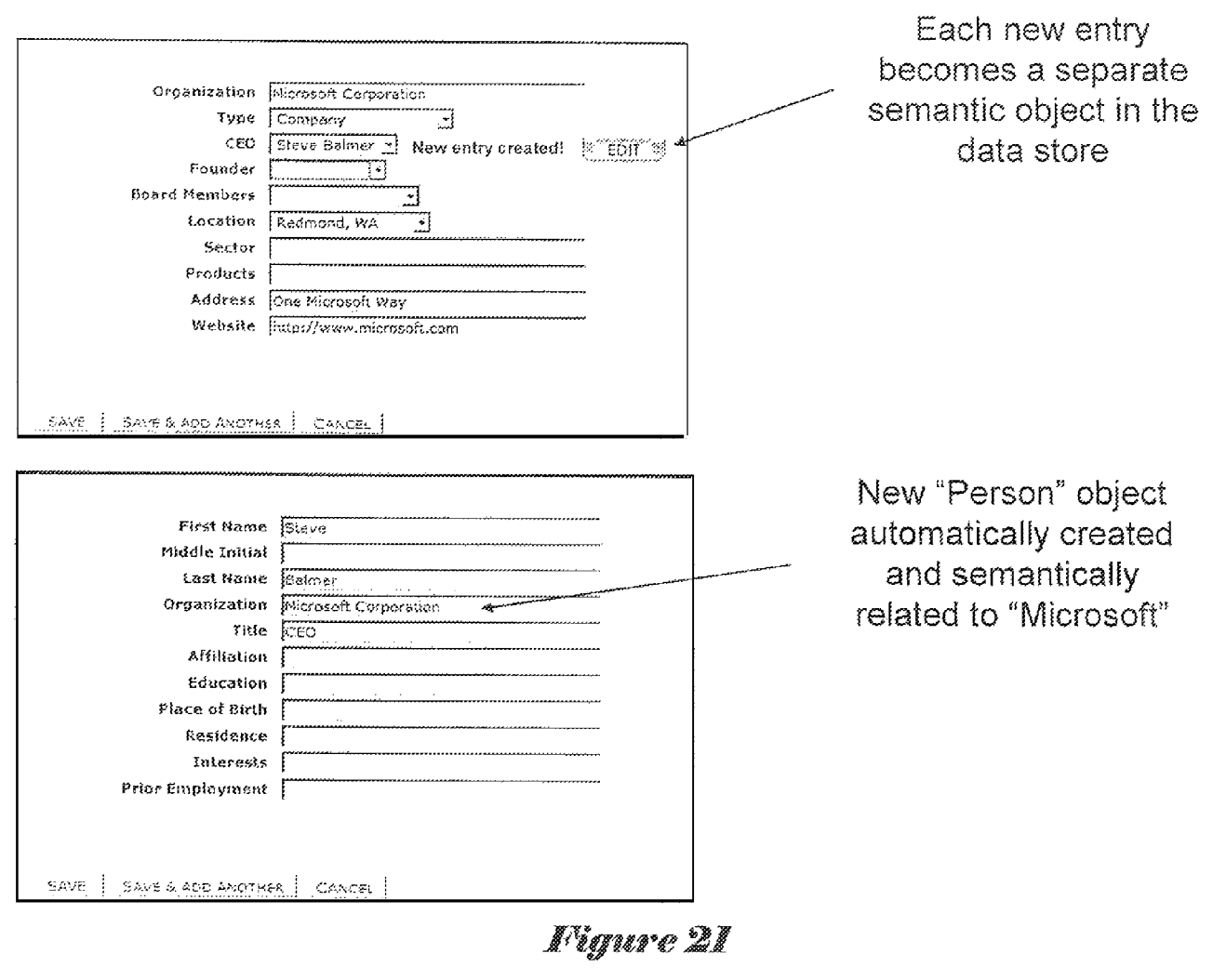

As discussed above, a concept-object database may be refined and supplemented, over time, by a community of users. FIGS. 19-21 illustrate concept-object-database refinement and augmentation according to an embodiment of the present invention. As shown in FIG. 19, an "EDIT" feature 1902 allows a user to invoke an editing dialog for editing and adding supplemental information to the concept object that represents the web concept object that represents the web page referenced by the displayed link 1904. User input to the "EDIT" feature invokes the input menus shown in FIGS. 20 and 21 that allow a user to alter annotation or fields associated with the concept object, and to add new semantic objects related to the edited concept object.

Figure 22:
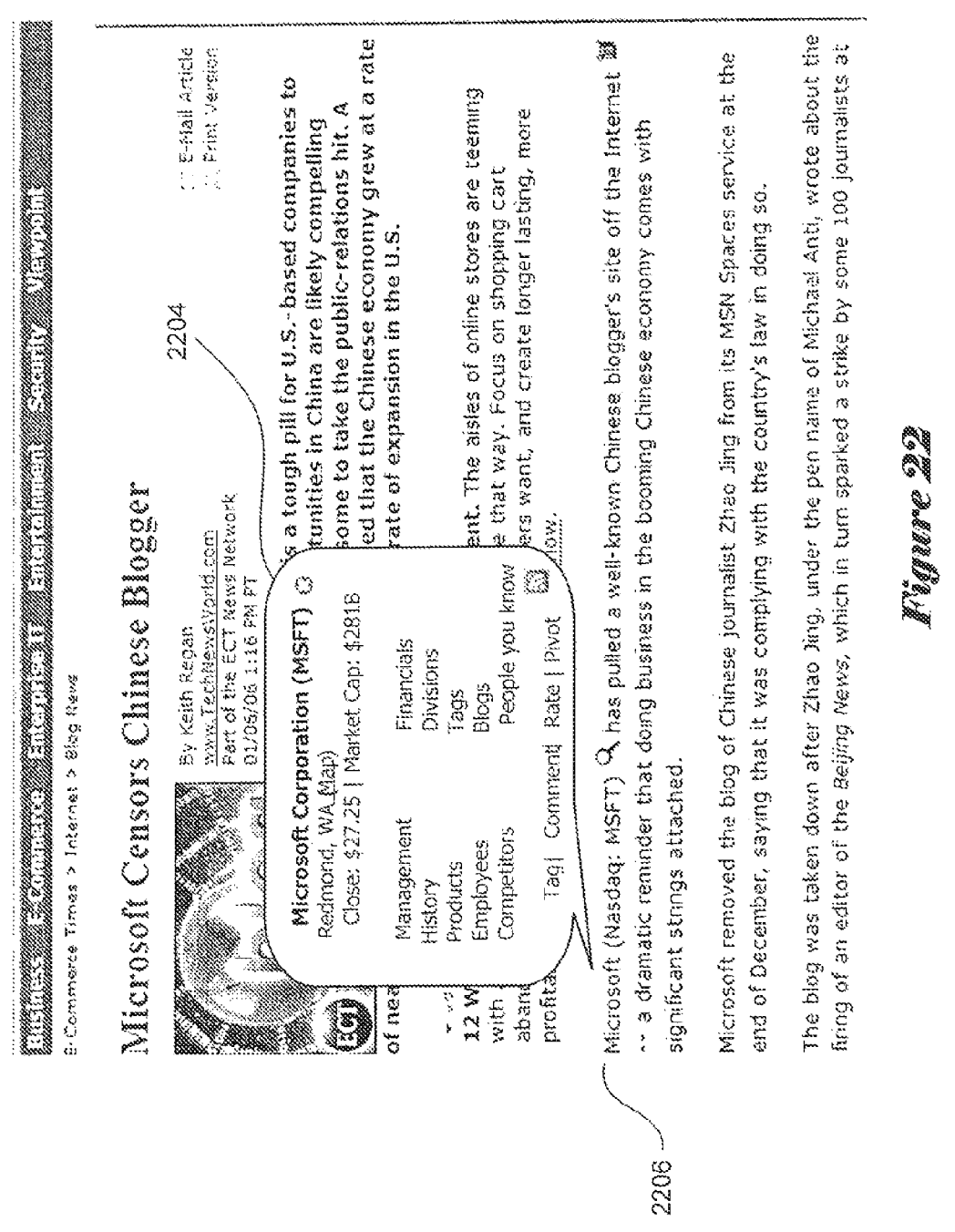
Figure 23:
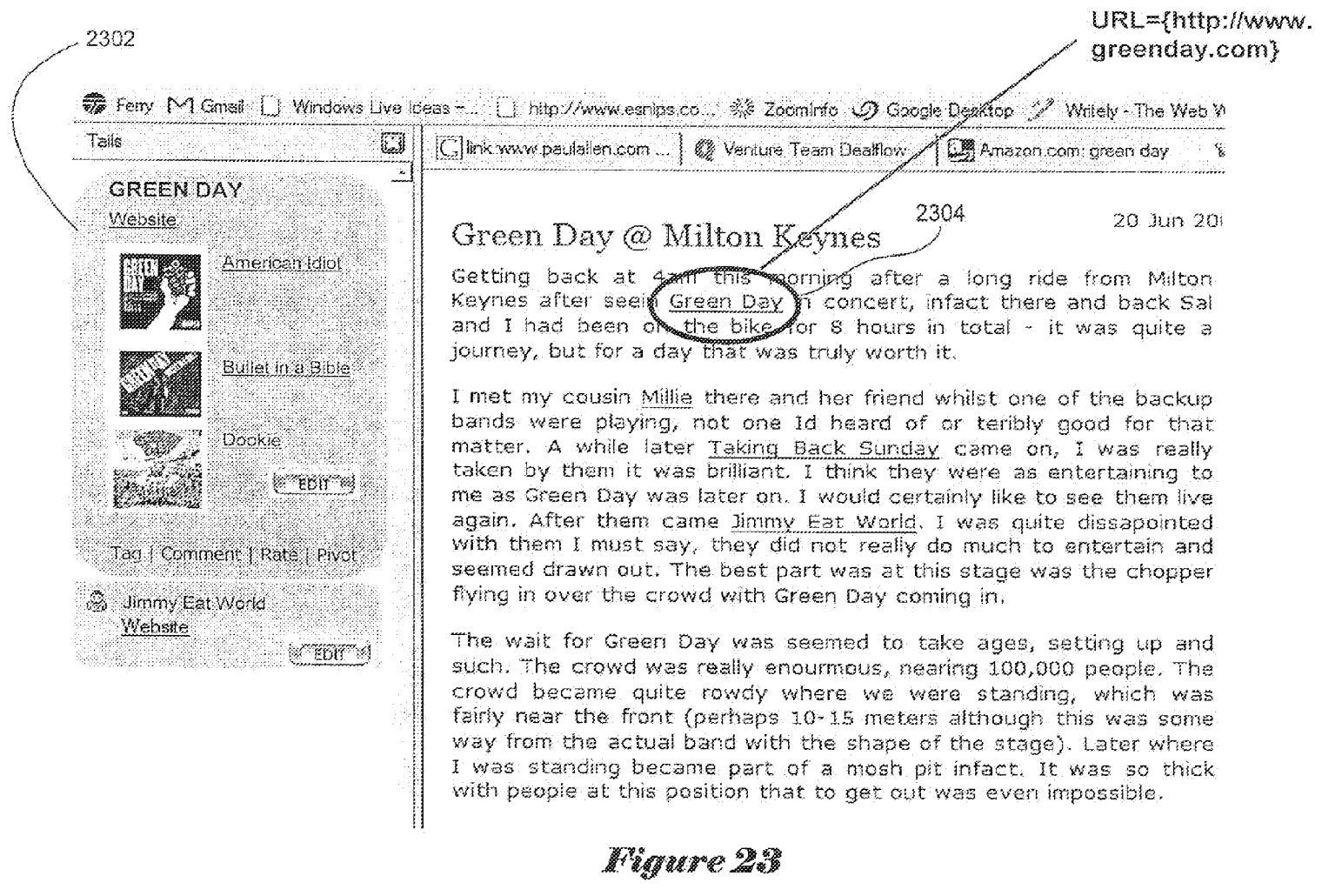
Figure 24:
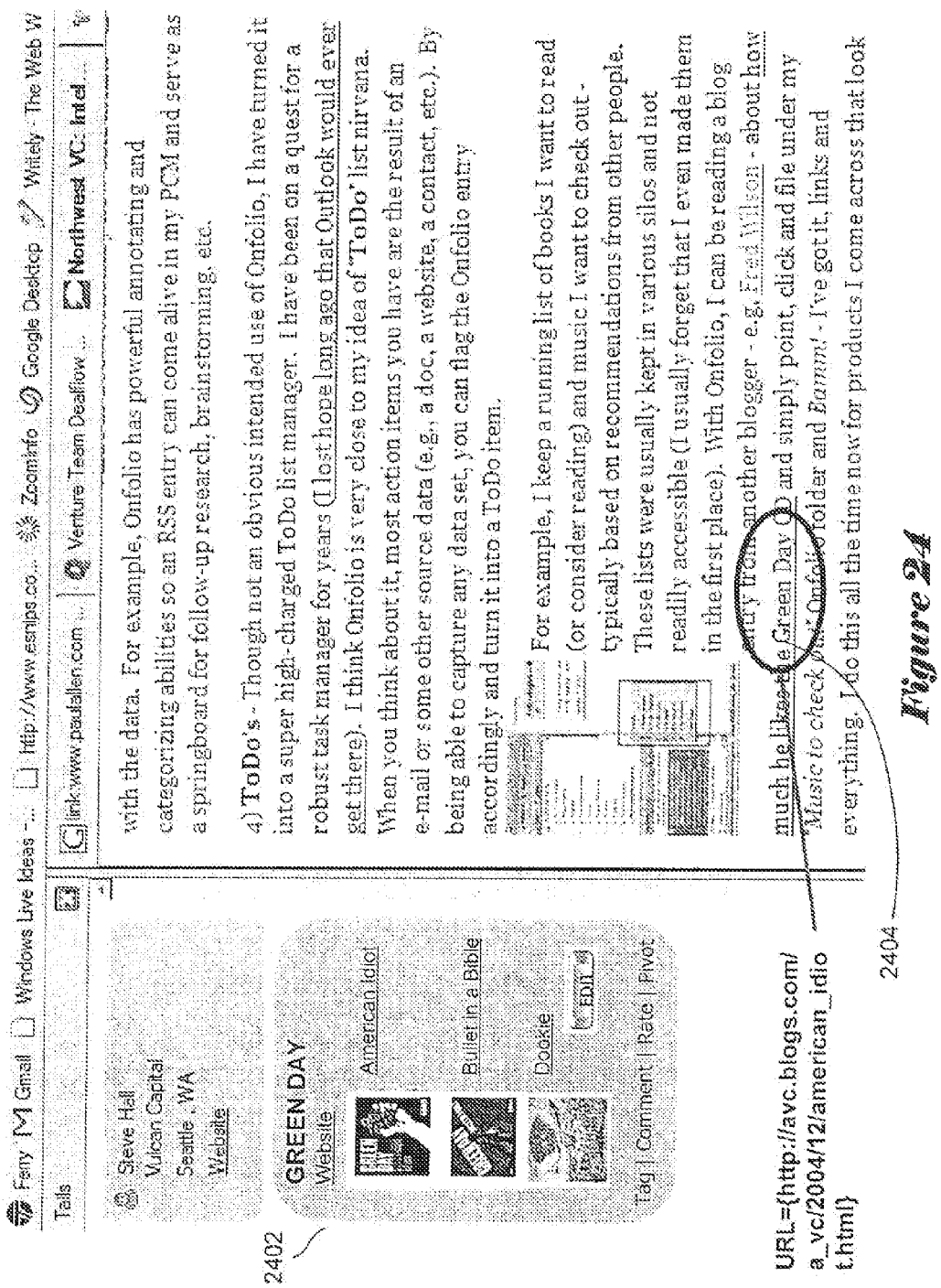

FIG. 22 illustrates an enhanced browser that creates pop-up windows overlying a displayed web page. For example, in FIG. 22, the pop-up 2204 containing information obtained from a particular corporation concept object is displayed in association with the occurrence of the name of the corporation 2206 within a displayed web page. FIGS. 23-24 illustrate additional web-browser enhancements according to an embodiment of the present invention. In FIG. 23, annotated, graphical links, such as annotated, graphical link 2302, that reference web pages represented by concept objects are displayed in the semantic sidebar for hyperlinks, such as hyperlink 2304, that occur in the rendered web page. Similarly, in the enhanced web browser shown in FIG. 24, annotated, graphical links 24 may be displayed that reference web pages represented by concept objects related through secondary links to text 2404 displayed within the rendered web page. In all of these web-browser enhancements, a concept-object database is searched to obtain the link and link annotations used to enhance web pages.

A concept-object database facilitates a wide variety of additional searching and browsing methods and techniques. For example, the concept-object database can itself be used as an index into the worldwide web to supplement or eventually replace keyword and key-symbol indexes used in current web-page searching methods discussed above with reference to FIG. 6. The concept-object database may be used in tandem with keyword-and-key-symbol-based searching techniques to reorder or winnow large result sets based on semantic relationships stored within the concept-object database in the form of concept objects, filtered-and-processed hyperlinks, and secondary links. Many other possible search-engine and web-browser enhancements will undoubtedly be revealed when concept-object databases and application programming interfaces to concept-object databases become available.

Although the present invention has been described in terms of particular particular embodiments, it is not intended that the invention be limited to these embodiments. Modifications within the spirit of the invention will be apparent to those skilled in the art. For example, an almost limitless number of different implementations of the above-described concept-object-database creation method, and systems which implement the method, are possible using different programming languages, modular organizations, data structures, control structures, and by varying other such programming and development parameters. As discussed above, concept-objects, filtered-and-processed hyperlink-based objects, and secondary links may be encoded and stored in a wide variety of different types of database primitives within many different types of database systems, including flat file systems. As discussed above, concept objects may include, in addition to the primary link and tags, or emergent terms, any number of additional data fields and references to other data objects, values for which are supplied during analysis of the filtered-and-processed-hyperlink-object context of the concept objects, and analysis of the concept-object database in its entirety. As discussed above, the concept-object database may be employed in a wide variety of web-page searching techniques and systems, web browsers, and other worldwide-web-related applications and methods.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. a method for creating a concept-object database, the method comprising:
    producing an initial set of semantic objects, each semantic object including a reference to encoded information and an initial list of one or more tags;
    extracting semantic objects from a compiled list of annotated links to web pages provided by a commercial web site;
    compiling semantic objects from analyzing hyperlink patterns and text and symbols associated with hyperlinks to identify web pages that represent concepts; and
    extracting information related to semantic objects from compiled directories, electronic directories, and other compiled and organized data bases, using the extracted information to locate electronic documents that represent web pages and other displayed information, and creating semantic objects corresponding to the electronic documents;
    binding hyperlinks to semantic objects and processing the hyperlink-bound semantic objects in order to produce a set of first-level concept objects; and
    binding additional hyperlinks to first-level concept objects and further processing the additional-hyperlink-bound first-level concept objects to produce a set of concept objects stored in a concept-object database.

2. The method of claim 1 wherein the encoded information includes one or more of:
    an HTML file;
    an audio file;
    a video file;
    a file containing encoded graphical information;
    an application-specific file;
    an executable file; and
    a text file.

3. The method of claim 1 wherein a tag comprises one or more of:
    a word;
    a symbol; and
    a phrase.

4. The method of claim 1 further including subsequently adding new concept objects to the concept-object database, the new concept objects created by one or more of:
    user input;
    additional searching of electronically encoded information; and
    analysis of currently available concept objects, hyperlink-based objects, and electronically encoded information referenced by hyperlink-objects.

5. Computer instruction encoded in a computer-readable storage medium, that implements a method for creating a concept-object database, the method comprising:
    producing an initial set of semantic objects, each semantic object including a reference to encoded information and an initial list of one or more tags;
    extracting semantic objects from a compiled list of annotated links to web pages provided by a commercial web site;
    compiling semantic objects from analyzing hyperlink patterns and text and symbols associated with hyperlinks to identify web pages that represent concepts; and
    extracting information related to semantic objects from compiled directories, electronic directories, and other compiled and organized data bases, using the extracted information to locate electronic documents that represent web pages and other displayed information, and creating semantic objects corresponding to the electronic documents;
    binding hyperlinks to semantic objects and processing the hyperlink-bound semantic objects in order to produce a set of first-level concept objects; and
    binding additional hyperlinks to first-level concept objects and further processing the additional-hyperlink-bound first-level concept objects to produce a set of concept objects stored in a concept-object database.

6. A concept-object database creation system comprising:
    one or more processors;
    a mass-storage subsystem; and
    computer instruction encoded in a computer-readable storage medium, that implement a method for creating a concept-object database, the method comprising:
    producing an initial set of semantic objects, each semantic object including a reference to encoded information and an initial list of one or more tags;
    extracting semantic objects from a compiled list of annotated links to web pages provided by a commercial web site;
    compiling semantic objects from analyzing hyperlink patterns and text and symbols associated with hyperlinks to identify web pages that represent concepts; and
    extracting information related to semantic objects from compiled directories, electronic directories, and other compiled and organized data bases, using the extracted information to locate electronic documents that represent web pages and other displayed information, and creating semantic objects corresponding to the electronic documents;
    binding hyperlinks to semantic objects and processing the hyperlink-bound semantic objects in order to produce a set of first-level concept objects; and
    binding additional hyperlinks to first-level concept objects and further processing the additional-hyperlink-bound first-level concept objects to produce a set of concept objects stored in a concept-object database.

* * * * *